(12) United States Patent
Tuffs et al.

(10) Patent No.: US 8,047,756 B2
(45) Date of Patent: Nov. 1, 2011

(54) AUTOMATIC LOAD TRANSFER DEVICE AND METHOD FOR AUTOMATED MATERIAL HANDLING SYSTEMS

(75) Inventors: Monte R. Tuffs, Belmont, MI (US); Garry A. Koff, Grand Rapids, MI (US); Jerry L. Redmann, Jr., Sparta, MI (US)

(73) Assignee: Savant Automation, Inc., Walker, MI (US)

( * ) Notice: Subject to any disclaimer, the term of this patent is extended or adjusted under 35 U.S.C. 154(b) by 880 days.

(21) Appl. No.: 12/080,725

(22) Filed: Apr. 4, 2008

(65) Prior Publication Data

US 2009/0252577 A1  Oct. 8, 2009

(51) Int. Cl.
*B65G 47/00* (2006.01)

(52) U.S. Cl. ...... 414/392; 414/279; 414/809; 198/463.3

(58) Field of Classification Search ............. 414/222.09, 414/222.11, 222.13, 265, 277, 278, 279, 414/281, 282, 283, 331.17, 390–392, 398, 414/584, 809, 917; 198/468.6, 817, 463.2, 198/463.3

See application file for complete search history.

(56) References Cited

U.S. PATENT DOCUMENTS

| | | | |
|---|---|---|---|
| 3,584,750 A | | 6/1971 | Temple |
| 3,958,701 A | | 5/1976 | Yatagai et al. |
| 4,273,234 A | * | 6/1981 | Bourgeois .................. 198/347.3 |
| 4,411,586 A | * | 10/1983 | Zitser et al. .................... 414/728 |
| 4,514,133 A | | 4/1985 | Vercruysse |
| 4,715,766 A | * | 12/1987 | Gebhardt ....................... 414/392 |
| 4,719,694 A | * | 1/1988 | Herberich et al. .............. 29/703 |
| 4,754,867 A | * | 7/1988 | De Anda ..................... 198/464.2 |
| 5,104,277 A | * | 4/1992 | Bullock ......................... 414/280 |
| 5,104,281 A | | 4/1992 | Corvi |
| 5,290,140 A | | 3/1994 | Henderson et al. |
| 5,545,967 A | | 8/1996 | Osborne et al. |
| 5,664,929 A | * | 9/1997 | Esaki et al. .................... 414/398 |
| 5,743,375 A | | 4/1998 | Shyr et al. |
| 6,746,198 B2 | * | 6/2004 | White et al. ............. 414/222.13 |
| 6,997,665 B2 | * | 2/2006 | Bouche et al. ................ 414/280 |
| 7,008,164 B2 | | 3/2006 | Rokkaku |
| 7,036,656 B2 | * | 5/2006 | Gariglio ..................... 198/689.1 |
| 7,261,511 B2 | | 8/2007 | Felder et al. |
| 7,458,455 B2 | * | 12/2008 | Nakamura et al. ......... 198/463.3 |
| 7,490,714 B2 | * | 2/2009 | Krause et al. ................. 198/817 |
| 7,686,560 B2 | * | 3/2010 | Laurin et al. .................. 414/278 |
| 7,695,235 B1 | * | 4/2010 | Rallis ............................ 414/400 |
| 7,731,013 B2 | * | 6/2010 | Milner et al. ............... 198/468.6 |
| 2003/0053894 A1 | | 3/2003 | Matsumoto |
| 2004/0056140 A1 | | 3/2004 | Brandli et al. |
| 2006/0216137 A1 | * | 9/2006 | Sakata et al. ............. 414/222.13 |
| 2006/0245862 A1 | * | 11/2006 | Hansl et al. .................... 414/281 |
| 2007/0101567 A1 | | 5/2007 | Suda et al. |
| 2007/0128010 A1 | * | 6/2007 | Gifford et al. ................. 414/281 |

* cited by examiner

*Primary Examiner* — Joshua Rudawitz
(74) *Attorney, Agent, or Firm* — Price Heneveld LLP

(57) ABSTRACT

An automatic load transfer device is provided for automated material handling systems of the type having a tow AGV pulling a train of trailers along a predetermined path between stations. The device has a base positioned adjacent to the path with spaced apart rails that support a movable carriage which shifts between retracted and extended positions. A conveyor having a plurality of side-by-side fingers with moving conveyor elements is supported on the carriage by a lift which shifts the conveyor between lowered and raised positions. The carriage, conveyor elements, and lift have separate drives that are operably connected with a controller which sequentially activates the same to load and/or unload loads onto and/or from the trailers.

38 Claims, 17 Drawing Sheets

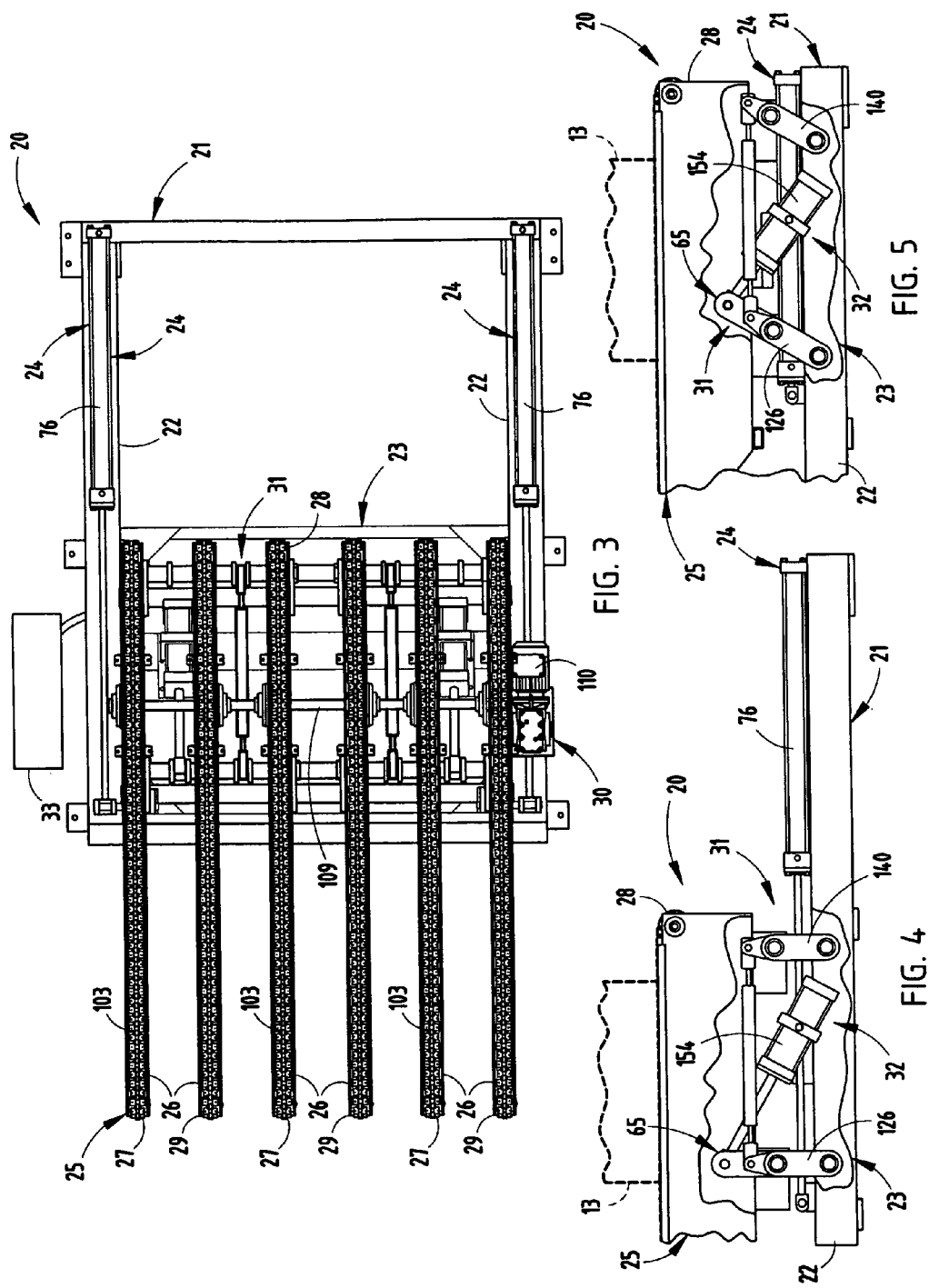

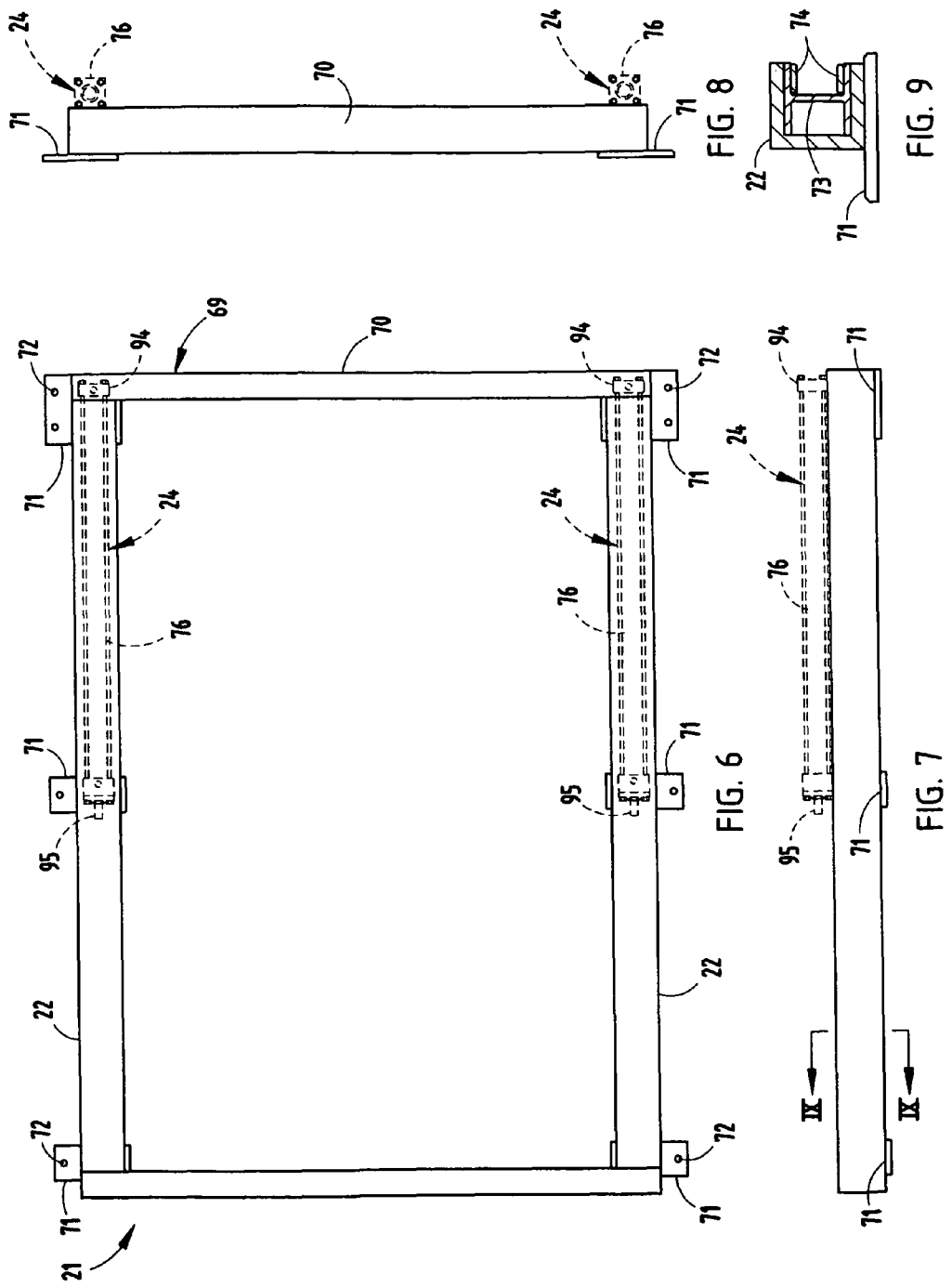

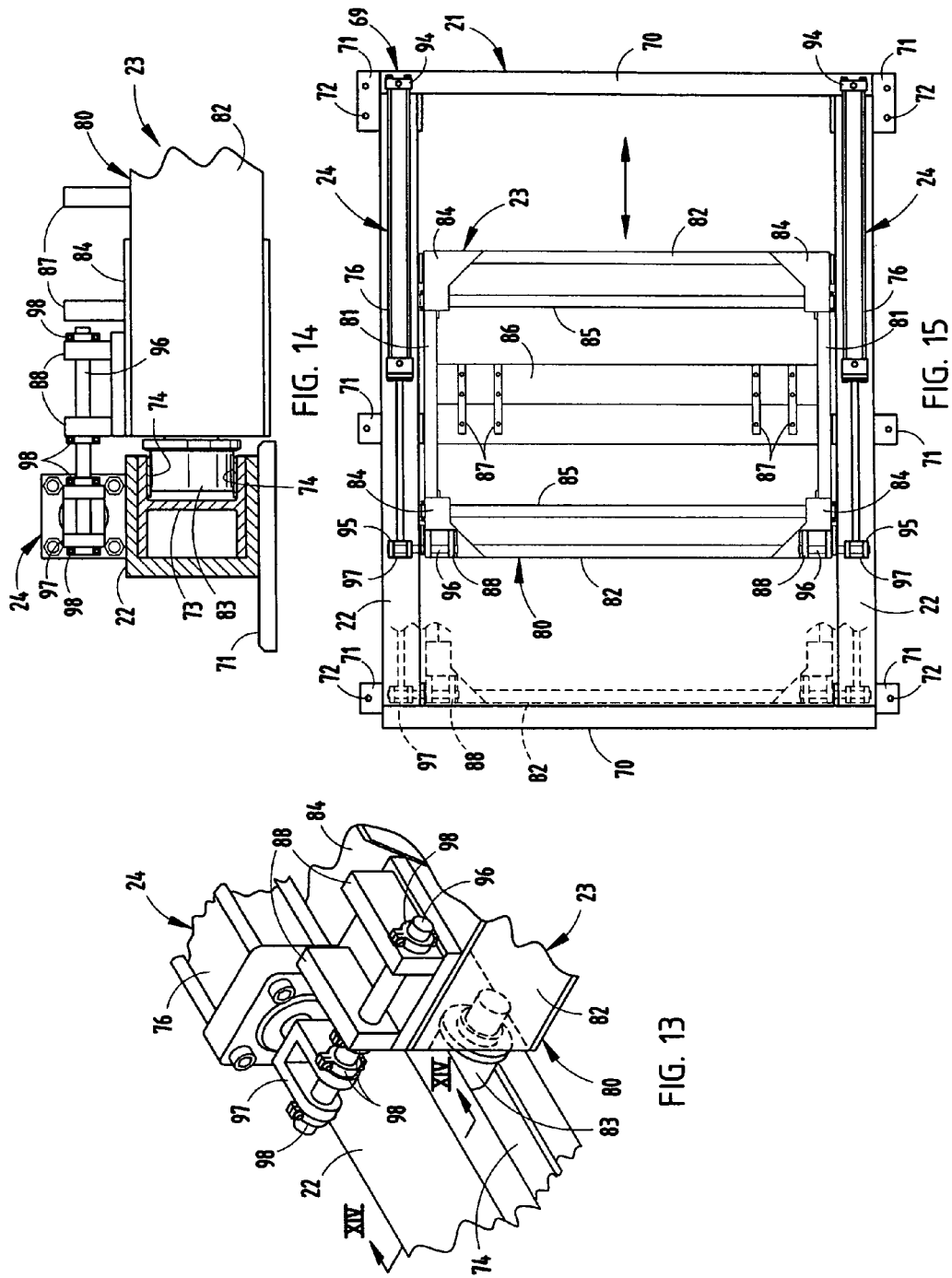

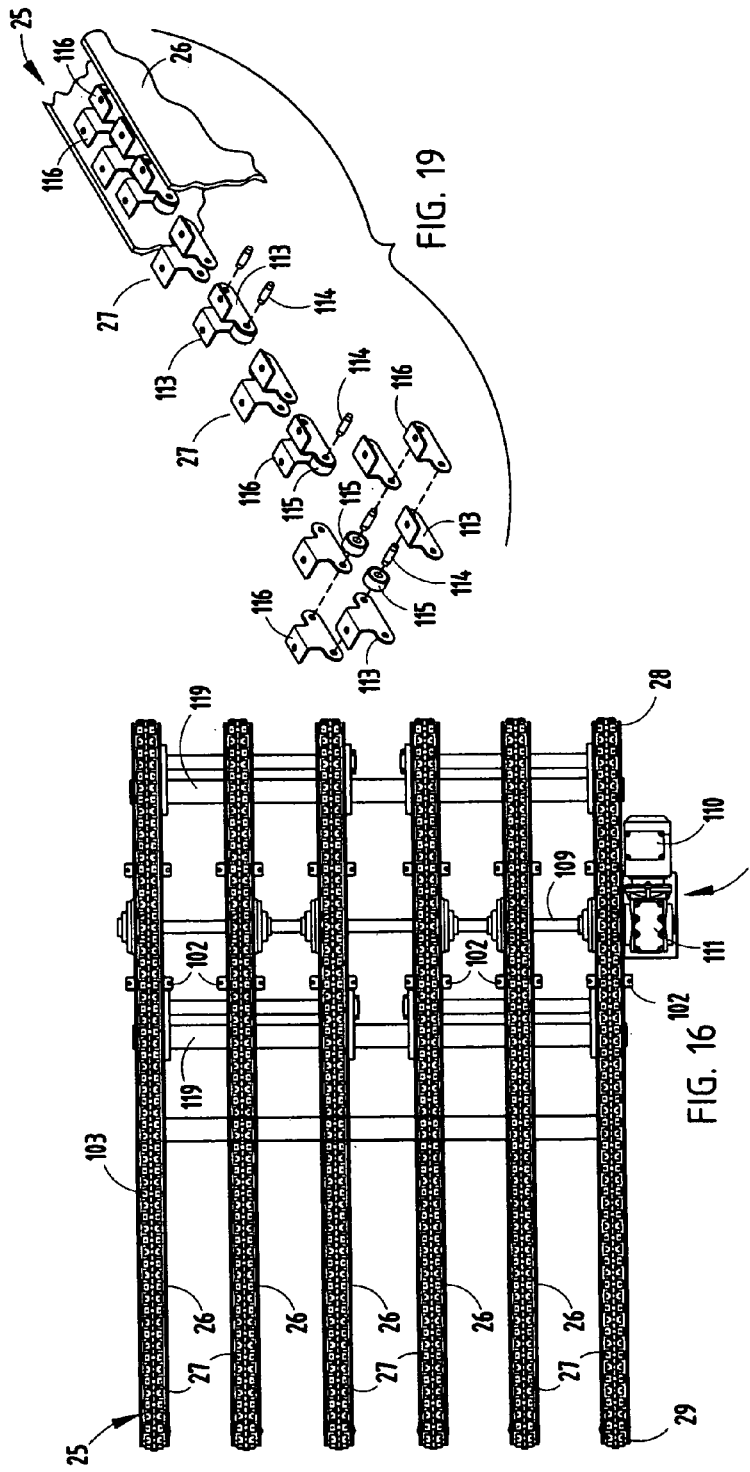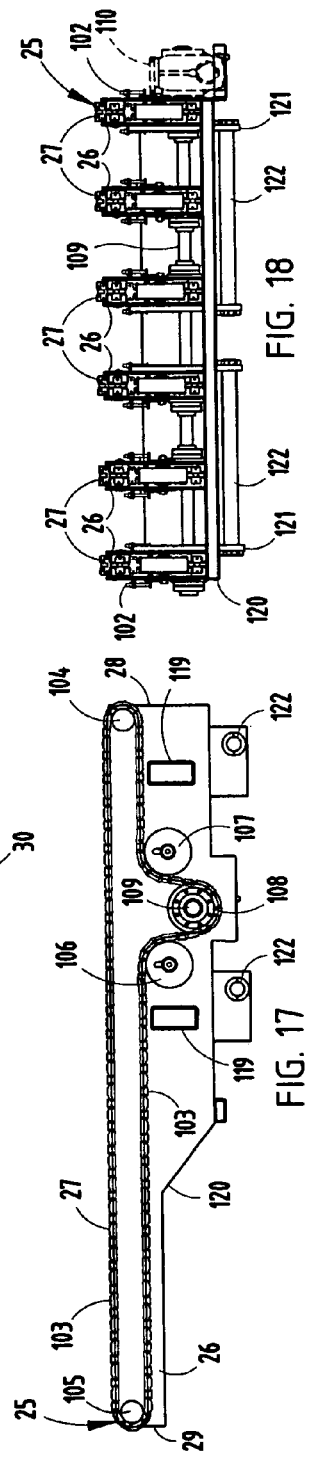

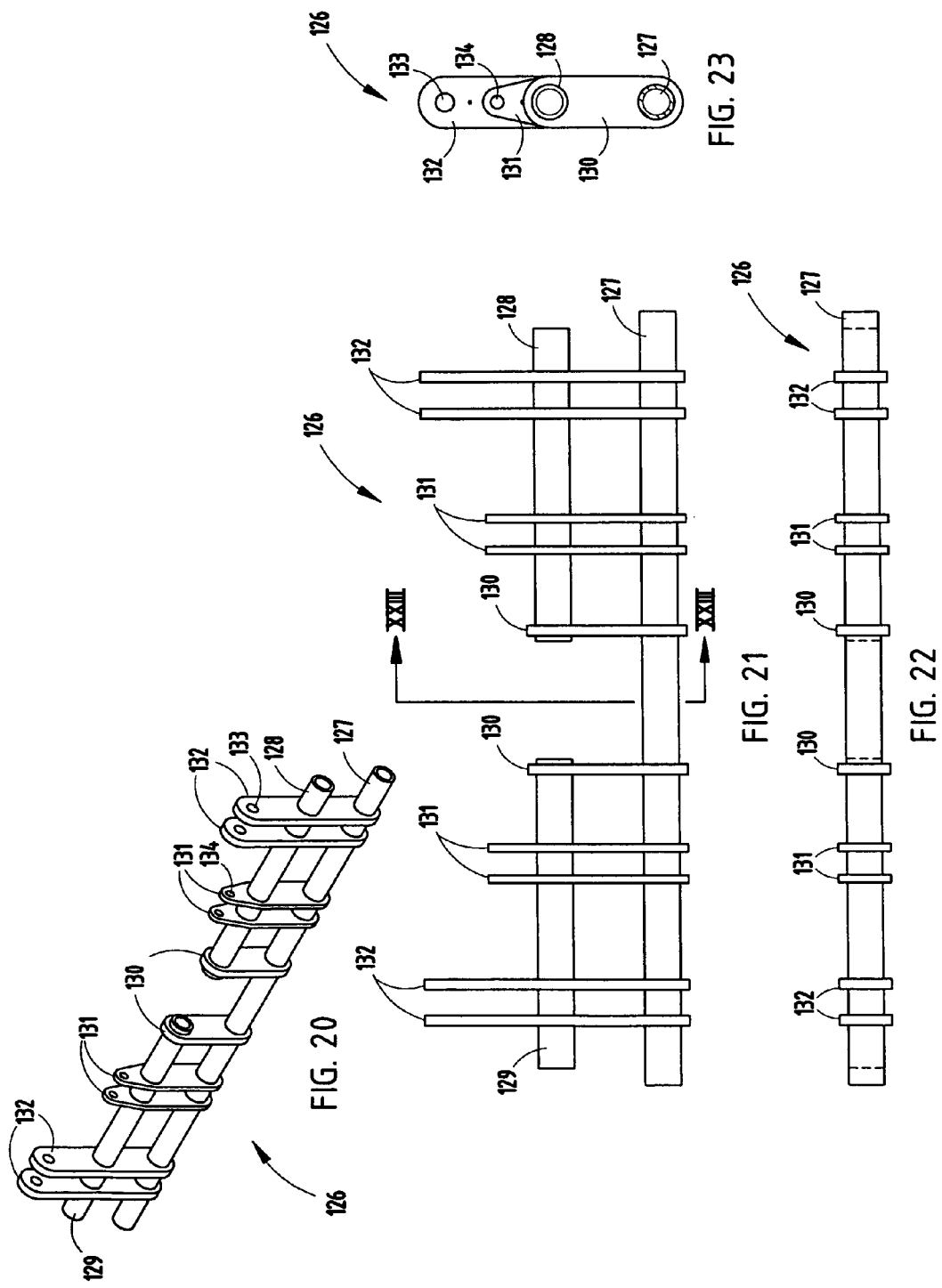

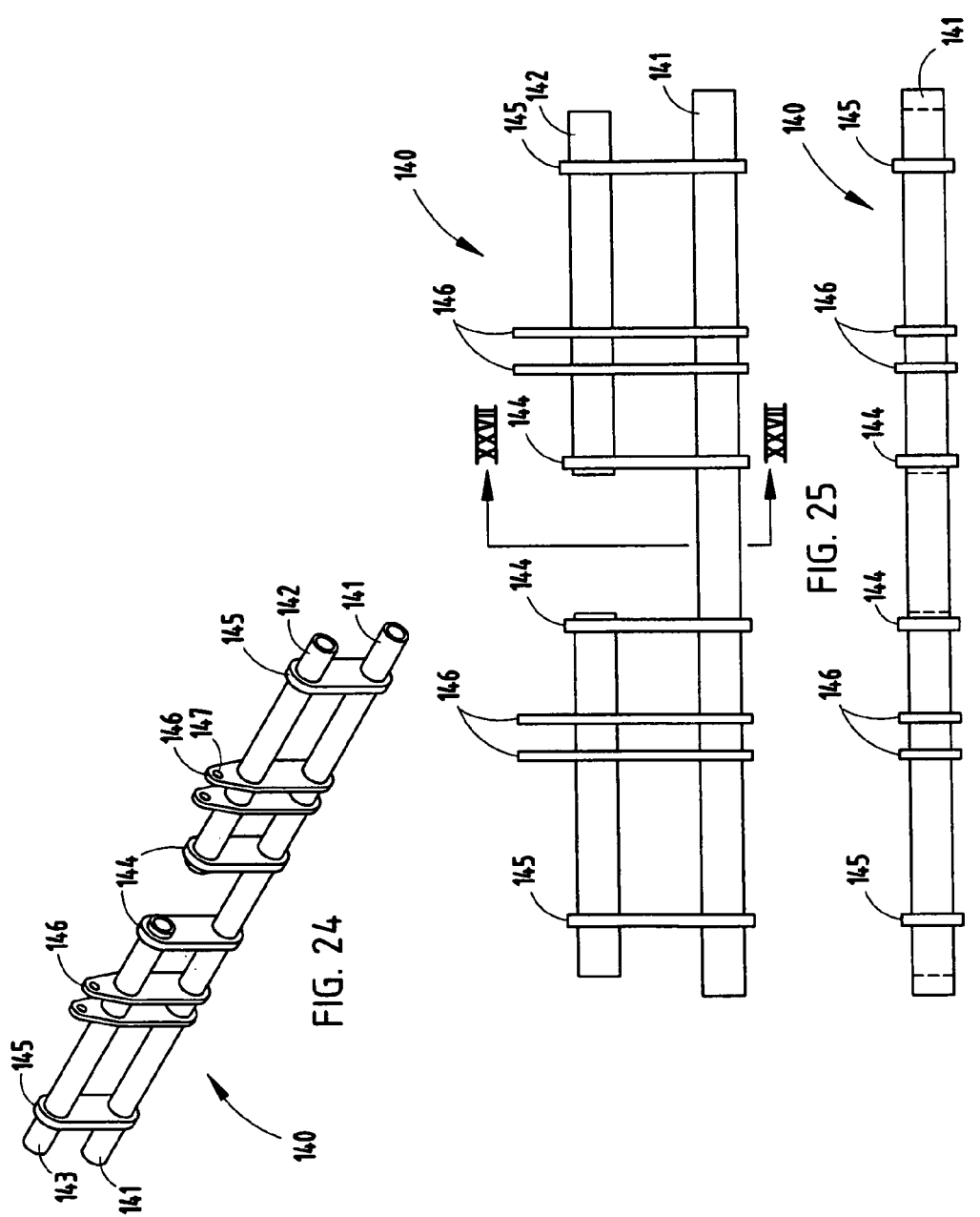

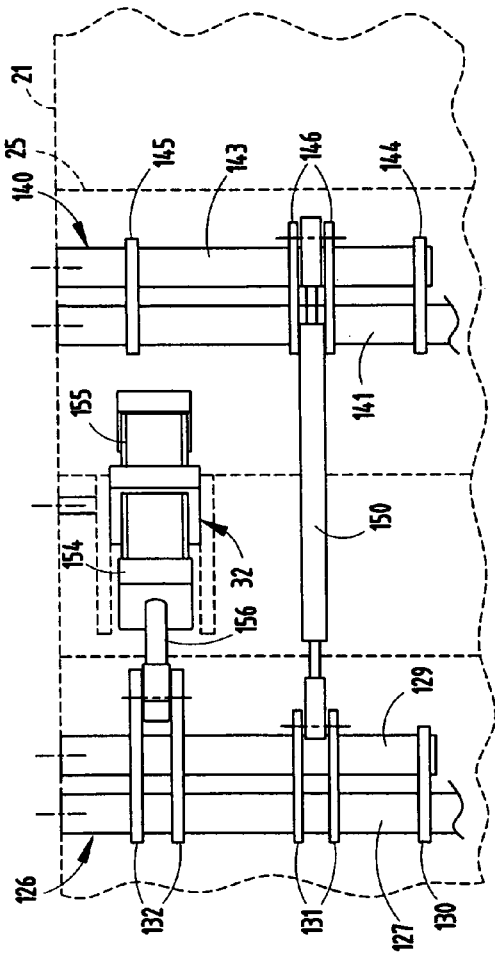
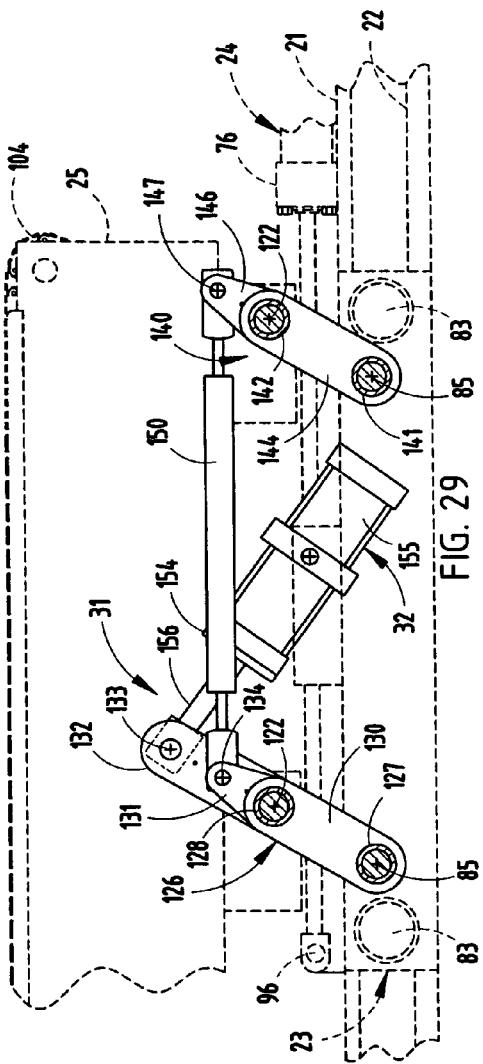
FIG. 28
FIG. 29

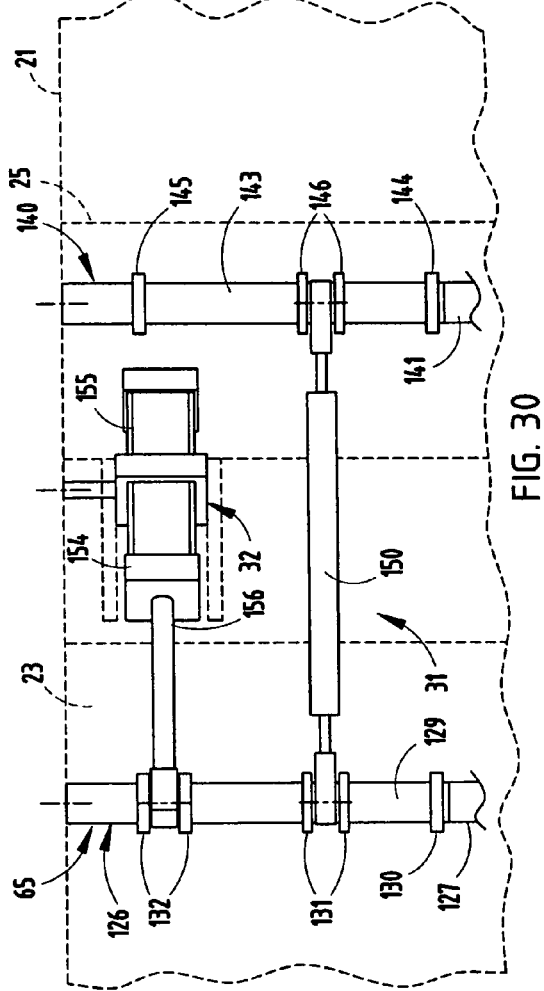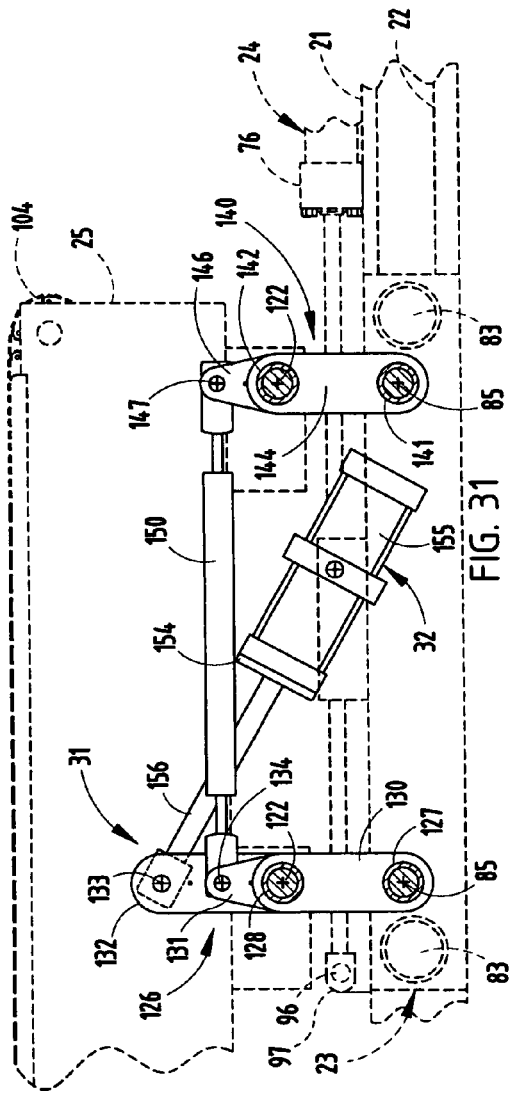

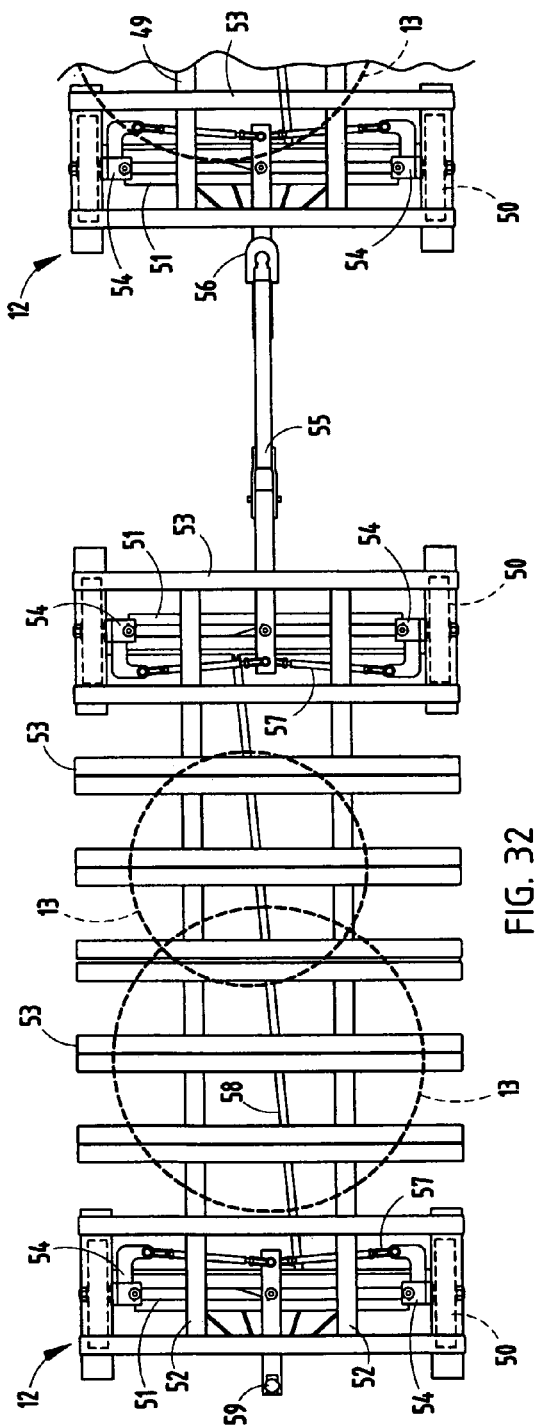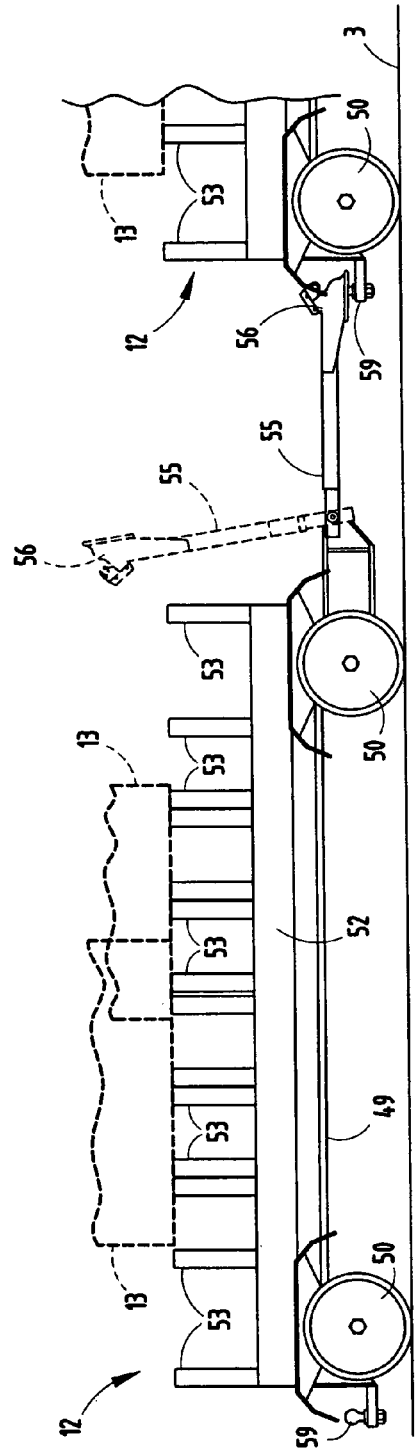
FIG. 32
FIG. 33

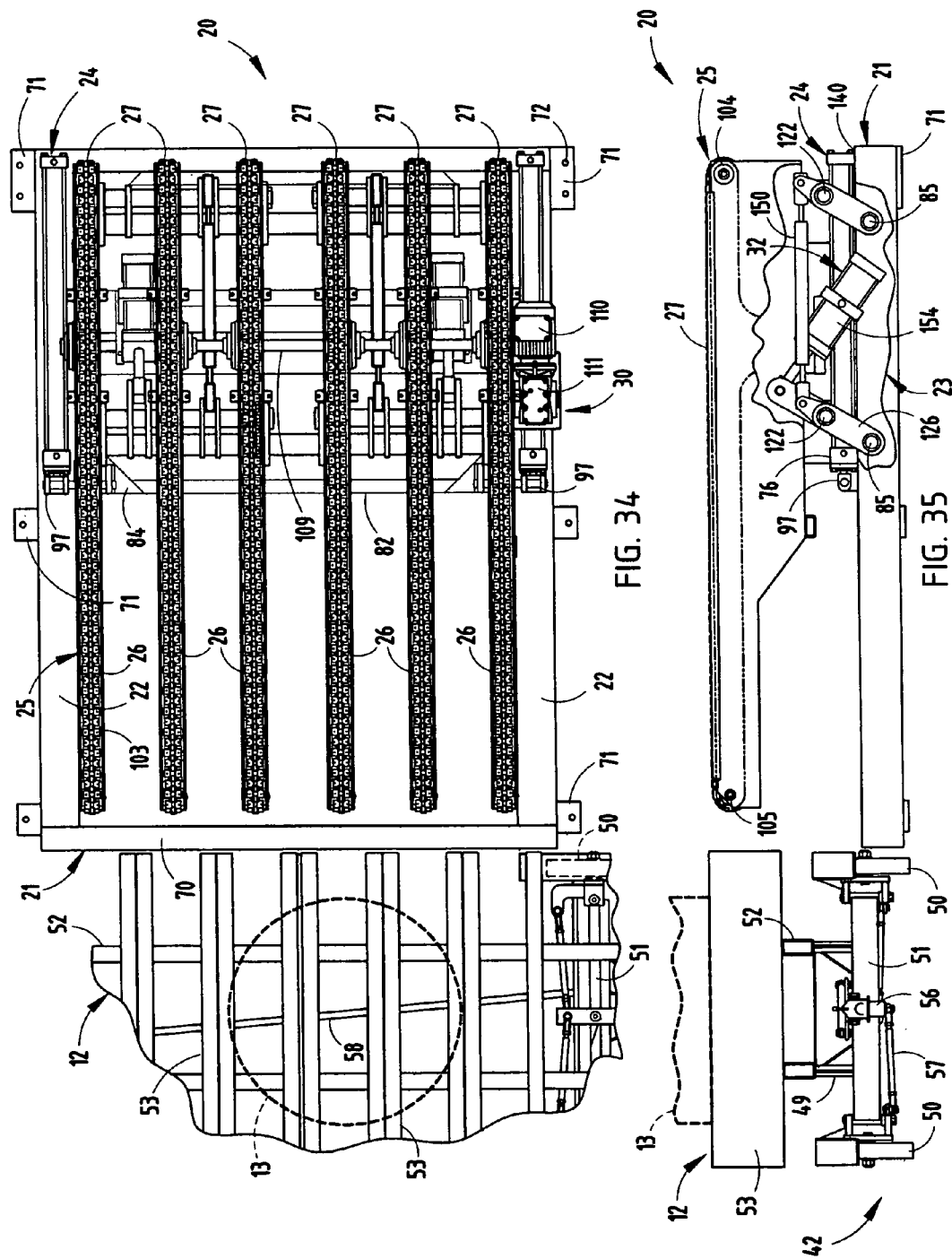

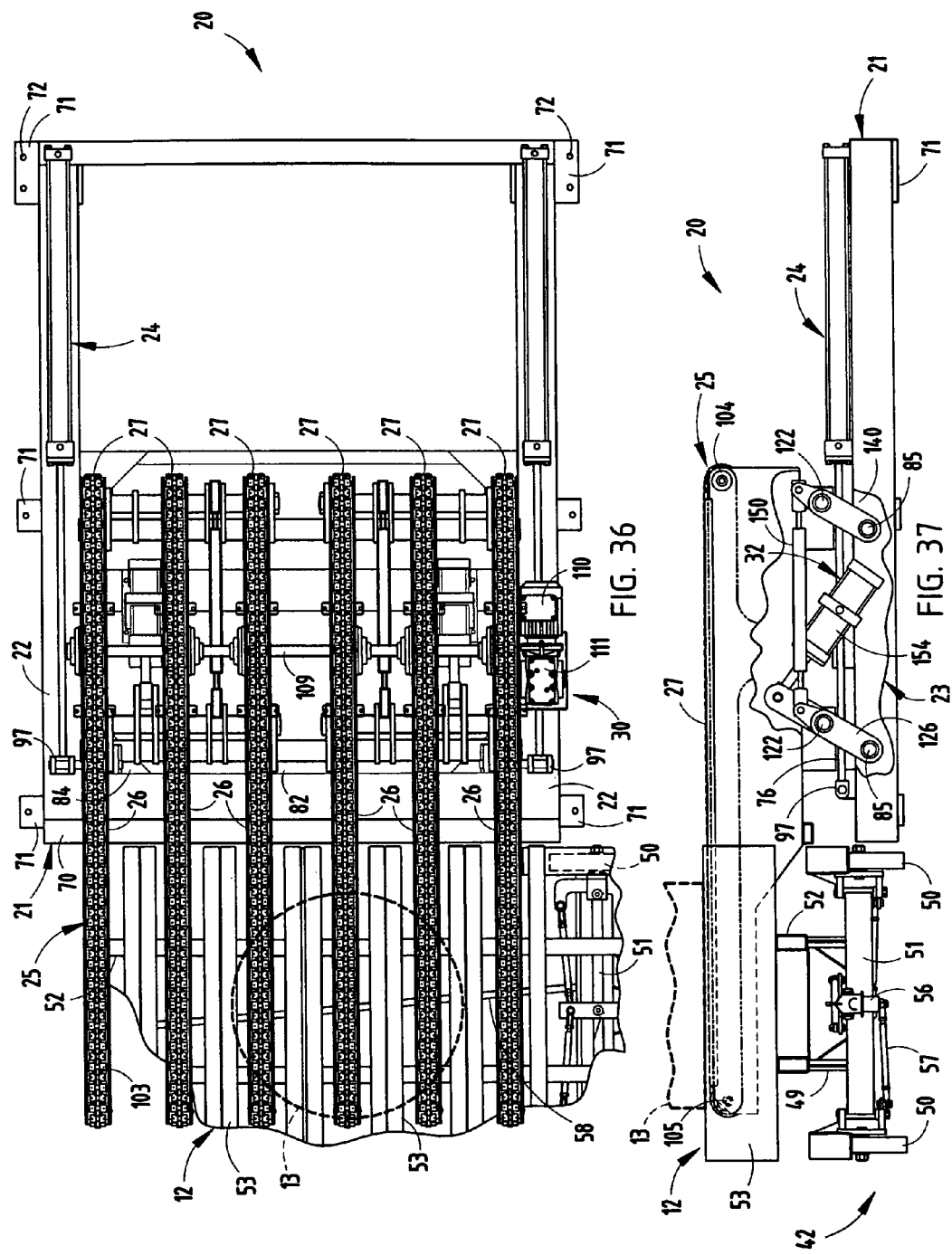

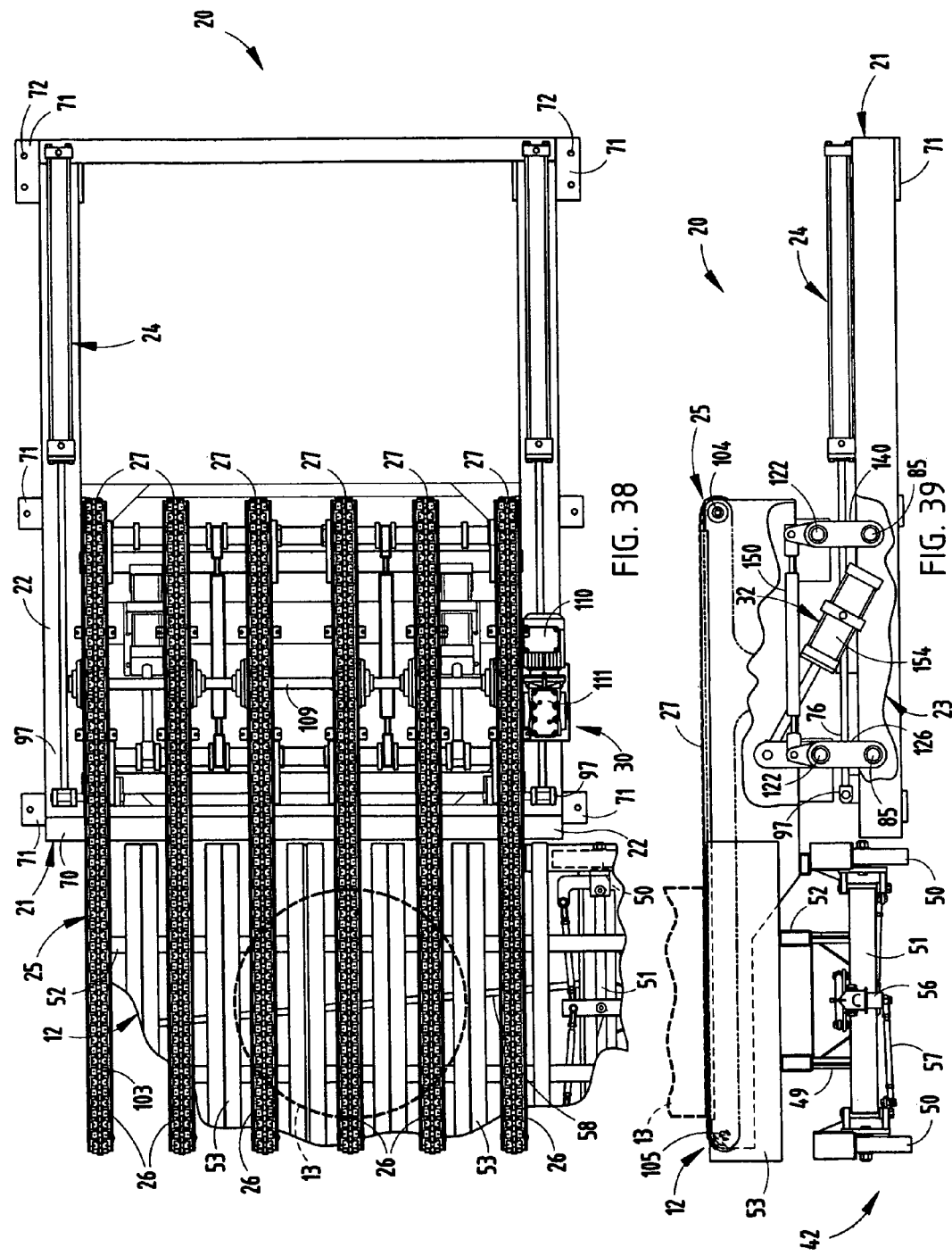

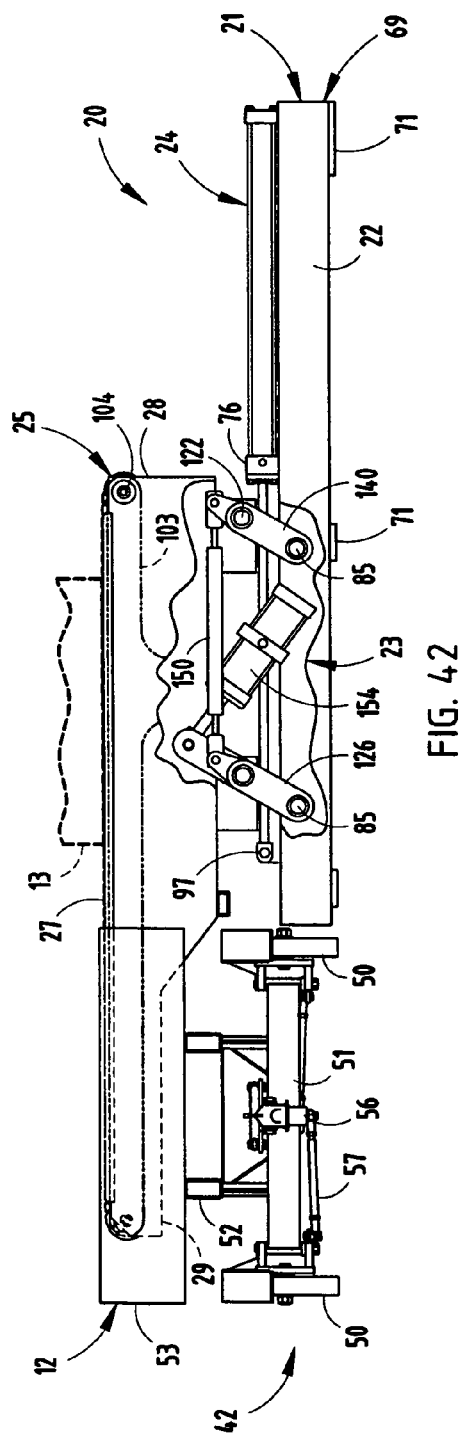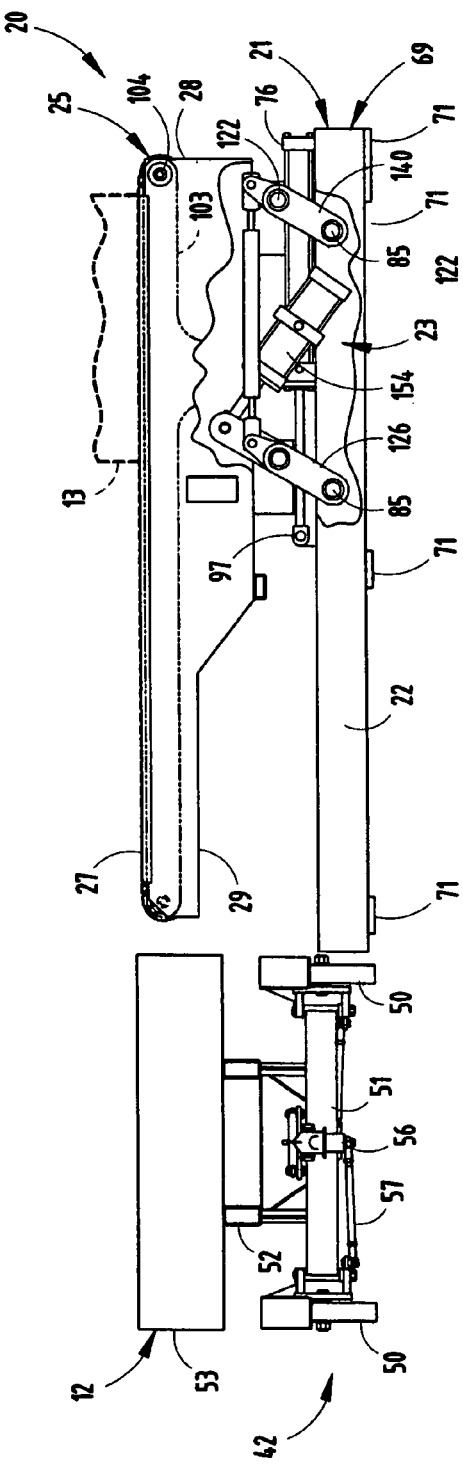

AUTOMATIC LOAD TRANSFER DEVICE AND METHOD FOR AUTOMATED MATERIAL HANDLING SYSTEMS

BACKGROUND OF THE INVENTION

The present invention relates to automated material handling systems, as well as an automatic load transfer device therefor.

Automatic guided vehicles ("AGV"s) are well known in the art, and are used in numerous automated material handling systems to move loads of raw materials, manufactured parts and/or other commodities between various stations. AGVs are typically grouped into four different types, including unit load AGVs, cart AGVs, fork AGVs and tow AGVs. Tow AGVs have sophisticated guidance systems, and are configured to pull conventional non-powered trailers arranged in a train. Unit load AGVs also have sophisticated guidance systems, and incorporate a mechanism to load and/or unload the same. Cart AGVs also have guidance systems, and are designed to place loads directly on top of the same, while fork lift AGVs are designed to lift palletized loads and deposit the same at a desired location. In general, unit load AGVs and fork AGVs are relatively expensive, at least for many applications, since they include both sophisticated guidance systems, and some form of integrated loading and/or unloading mechanism.

A need exists for an automated material handling system which is economical, and can efficiently and reliably transport loads between various stations even in challenging environments, such as heavy manufacturing and industrial plants, outside warehouse transports and the like. Such automated material handling systems preferably should have high uptime reliability, durability, and be capable of moving even heavy loads quickly over a wide variety of floor surfaces without damage to fragile loads. It is also advantageous that the system is uncomplicated in construction, and can be readily expanded, or reconfigured to accommodate a wide variety of different applications.

SUMMARY OF THE INVENTION

One aspect of the present invention is an automated material handling system, comprising a tow AGV having a guidance system configured to automatically navigate the AGV along a predetermined path between various workstations. A plurality of non-powered tow trailers configured to support a plurality of loads thereon are interconnected in an end-to-end train, and are operably connected with the tow AGV to move the train of tow trailers along the path between the workstations. An automatic load transfer device includes a base configured for mounting on a stationary support surface disposed adjacent to the path, and includes a pair of longitudinally extending, laterally spaced apart rails disposed in a generally parallel relationship. A carriage is movably mounted on the rails of the base for longitudinal movement therealong between a retracted position and an extended position. A carriage drive is operably connected with the base and the carriage, and automatically shifts the carriage between the retracted and extended positions. A conveyor has a plurality of rigid, elongate conveyor fingers which are arranged in a generally parallel, laterally spaced apart relationship, and support thereon movable conveyor elements configured to abuttingly support variously shaped loads thereon and shift the loads between inboard and outboard ends of the conveyor. A conveyor drive is operably connected with the conveyor elements and automatically shifts the conveyor elements between the outboard end and the inboard end of the conveyor. A lift has a first portion operably connected with the base, an oppositely disposed second portion operably connected with the conveyor, and a lift drive automatically shifting the conveyor between a lowered position and a raised position. The second portion of the lift is connected with a rearward portion of the conveyor, whereby when the carriage is in the extended position, the outboard end of the conveyor protrudes outwardly from the base, and is supported thereon in a cantilevered fashion above the path. A controller is operably connected with the carriage drive, the conveyor drive and the lift drive, and sequentially activates the same to load and unload loads onto and from the tow trailers by shifting the carriage between the retracted and extended positions into and out of vertical alignment with the tow trailers, shifting the conveyor between the lowered and raised positions to shift the loads onto and off of the tow trailers, and shifting the conveyor elements between the inboard and outboard ends of the conveyor to move the loads toward and away from the tow trailers.

Another aspect of the present invention is an automatic unloader for automated material handling systems of the type which moves loads between various workstations on transport vehicles. The automatic unloader includes a base configured for mounting on a stationary support surface, and includes a pair of longitudinally extending, laterally spaced apart rails disposed in a generally parallel relationship. A carriage is movably mounted on the rails of the base for longitudinal movement therealong between a retracted position and an extended position. A carriage drive is operably connected with the base and the carriage, and automatically shifts the carriage between the retracted and extended positions. A conveyor has a plurality of rigid, elongate guide bars arranged in a generally parallel, laterally spaced apart relationship, and movably supports thereon conveyor elements configured to abuttingly support variously shaped loads thereon and shift the loads from the outboard end to the inboard end of the conveyor. A conveyor drive is operably connected with the conveyor elements and automatically shifts the conveyor elements from the outboard end to the inboard end of the conveyor. A coupler has a first portion pivotally connected with the base and an oppositely disposed second portion pivotally connected with the conveyor, whereby rotation of the coupler shifts the conveyor between a lowered position and a raised position. A second portion of the coupler is connected with a rearward portion of the conveyor, whereby when the carriage is in the extended position, the outboard end of the conveyor protrudes outwardly from the base, and is supported thereon in a cantilevered fashion. A lift drive is operably connected with at least one of the coupler, the carriage, and the conveyor, and automatically shifts the conveyor between the lowered and raised positions. A controller is operably connected with the carriage drive, the conveyor drive and the lift drive, and sequentially activates the same to unload loads from an associated transport vehicle by shifting the carriage from the retracted position to the extended position in general vertical alignment with and below the loads disposed on the associated transport vehicle, shifting the conveyor from the lowered position to the raised position to lift the loads off of the associated transfer vehicle and onto the conveyor elements, and shifting the conveyor elements toward the inboard end of the conveyor to move the loads out of vertical alignment with and away from the associated transport vehicle.

Yet another aspect of the present invention is an automatic loader for automated material handling systems of the type which moves loads between various workstations on transport vehicles. The automatic loader include a base configured for mounting on a stationary support surface and includes a pair of longitudinally extending, laterally spaced apart rails disposed in a generally parallel relationship. A carriage is movably mounted on the rails of the base for longitudinal movement therealong between a retracted position and an extended position. A carriage drive is operably connected with the base and the carriage, and automatically shifts the carriage between the retracted and extended positions. A conveyor has a plurality of rigid, elongate guide bars arranged in a generally parallel, laterally spaced apart relationship, and movably supports thereon conveyor elements configured to abuttingly support variously shaped loads thereon and shift the loads from the inboard end to the outboard end of the conveyor. A conveyor drive is operably connected with the conveyor elements and automatically shifts the conveyor elements from the inboard end to the outboard end of the conveyor. A coupler has a first portion pivotally connected with the base and an oppositely disposed second portion pivotally connected with the conveyor, whereby rotation of the coupler shifts the conveyor between a lowered position and a raised position. The second portion of the coupler is connected with a rearward portion of the conveyor, whereby when the carriage is in the extended position, the outboard end of the conveyor protrudes outwardly from the base, and is supported thereon in a cantilevered fashion. A lift drive is operably connected with at least one of the coupler, the carriage, and the conveyor, and automatically shifts the conveyor between the lowered and raised positions. A controller is operably connected with the carriage drive, the conveyor drive and the lift drive, and sequentially activates the same to load loads onto an associated transport vehicle by shifting the conveyor with the loads thereon to the raised position, shifting the conveyor elements with the loads thereon toward the outboard end of the conveyor, shifting the carriage to the extended position to position the loads in general vertical alignment with and above the associated transport vehicle, and shifting the conveyor with the loads thereon toward the lowered position to place the loads onto the associated transport vehicle.

Yet another aspect of the present invention is a fully automated method for handling materials, comprising providing a tow AGV having a guidance system configured to automatically navigate the tow AGV along a predetermined path between a plurality of different workstations in a predetermined sequence, and providing a plurality of non-powered tow trailers configured to abuttingly support a plurality of loads thereon. The method also includes forming a vehicle track adapted to abuttingly support the AGV and the tow trailers thereon, and having a predetermined configuration that extends along the predetermined path between the workstations, and installing a guide path in the vehicle track which communicates with the AGV, and includes at least one load/unload station. The method further includes interconnecting the tow trailers in an end-to-end train, and operably connecting the train of tow trailers with the tow AGV to selectively move the train of tow trailers along the vehicle track in a predetermined sequence between the workstations. The method also includes positioning an automatic loader/unloader adjacent to the loading/unloading station along the vehicle track, wherein the loader/unloader has a stationary base with a movable carriage supported thereon for automatically shifting the carriage between retracted and extended positions by a carriage drive, a conveyor with a plurality of side-by-side fingers with movable conveyor elements that abuttingly support loads thereon and are automatically shifted between outboard and inboard ends of the conveyor by a conveyor drive, and a lift operably connected between the carriage and the conveyor with a lift drive that automatically shifts the conveyor between lowered and raised positions, such that in the extended position, the outboard conveyor end protrudes outwardly from the base and is supported thereon in a cantilevered fashion above the vehicle track. The method also includes programming the AGV to position a first one of the tow trailers with loads thereon at the load/unload station and sequentially activating the carriage drive, the conveyor drive and the lift drive to unload the loads disposed on the first tow trailer by shifting the carriage from the retracted position to the extended position in general vertical alignment with and below the loads disposed on the first tow trailer, shifting the conveyor from the lowered position to the raised position to lift the loads off of the first tow trailer and onto the conveyor elements, and shifting the conveyor elements toward the inboard end of the conveyor to move the loads out of vertical alignment with and away from the first tow trailer. The method may also includes sequentially activating the carriage drive, the conveyor drive and the lift drive to load loads onto the first tow trailer by shifting the conveyor with the loads thereon to the raised position, shifting the conveyor elements with the loads thereon toward the outboard end of the conveyor, shifting the conveyor to the extended position to position the loads in general vertical alignment with and above the first tow trailer, and shifting the conveyor with the loads thereon toward the lowered position to place the loads onto the first tow trailer.

Yet another aspect of the present invention is an automated material handling system which is economical, and can efficiently and reliably transport loads between various stations even in challenging environments, such as heavy manufacturing and industrial plants, outside warehouse transports and the like. The use of a tow or tugger AGV in conjunction with non-powered, dumb trailers and a stationary, fully automated loader/unloader provides substantial reliability, economy and maintenance benefits. The automated material handling system has high uptime reliability, durability, and is capable of moving even heavy loads quickly over a wide variety of floor surfaces without damage to fragile loads. The automated material handling system has an uncomplicated construction, and can be readily expanded or reconfigured to accommodate a wide variety of different applications. The material handling system is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 3 is a top plan view of the automatic loader/unloader.

FIG. 4 is a fragmentary side elevational view of the automatic loader/unloader, shown in the fully extended and fully raised position.

FIG. 5 is a fragmentary side elevational view of the automatic loader/unloader, shown in a fully retracted and fully lowered position.

FIG. 6 is a top plan view of a base portion of the automatic loader/unloader.

FIG. 7 is a side elevational view of the base.

FIG. 8 is an end elevational view of the base.

FIG. 9 is an enlarged vertical cross-sectional view of a track portion of the base.

FIG. 13 is a fragmentary perspective view of the carriage mounted on the base.

FIG. 14 is a fragmentary cross-sectional view of the carriage mounted on the base.

FIG. 15 is a top plan view of the carriage mounted on the base for reciprocation between extended and retracted positions.

FIG. 16 is a top plan view of a conveyor portion of the automatic loader/unloader.

FIG. 17 is a vertical cross-sectional view of the conveyor.

FIG. 18 is a front end elevational view of the conveyor.

FIG. 19 is a fragmentary perspective view of a conveyor chain and finger portion of the conveyor.

FIG. 20 is a perspective view of a forward linkage portion of the automatic loader/unloader which interconnects the conveyor with the carriage.

FIG. 21 is a front elevational view of the forward linkage.

FIG. 22 is a bottom plan view of the forward linkage.

FIG. 23 is a vertical cross-sectional view of the forward linkage taken along the line XXIII-XXIII, FIG. 21.

FIG. 24 is a perspective view of a rearward linkage portion of the automatic loader/unloader which interconnects the conveyor with the carriage.

FIG. 25 is a front elevational view of the rearward linkage.

FIG. 26 is a bottom plan view of the rearward linkage.

FIG. 27 is a vertical cross-sectional view of the rearward linkage taken along the line XXVII-XXVII, FIG. 25.

FIG. 28 is a fragmentary top plan view of the automatic loader/unloader, showing the forward and rearward linkages, and a lift drive portion thereof in the fully lowered position.

FIG. 29 is a fragmentary side elevational view of the automatic loader/unloader, showing the forward and rearward linkages, and the lift drive in the fully lowered position.

FIG. 30 is a fragmentary top plan view of the automatic loader/unloader, showing the forward and rearward linkages, and the lift in the fully raised position.

FIG. 31 is a fragmentary side elevational view of the automatic loader/unloader, showing the forward and rearward linkages, and the lift drive in the fully raised position.

FIG. 32 is a fragmentary top plan view of a pair of interconnected tow trailers used in the automated material handling system.

FIG. 33 is a fragmentary side elevational view of the tow trailers shown in FIG. 32.

FIG. 34 is a top plan view of an automatic loader/unloader, shown in the fully retracted and fully lowered position, with a loaded tow trailer parked at an adjacent unloading station.

FIG. 35 is a side elevational view of the automatic loader/unloader and tow trailer, shown in the position illustrated in FIG. 34.

FIG. 36 is a top plan view of the automatic loader/unloader, shown in the fully extended and fully lowered position, with the conveyor fingers positioned vertically in line with and below the load on the tow trailer.

FIG. 37 is a side elevational view of the automatic loader/unloader and tow trailer, shown in the position illustrated in FIG. 36.

FIG. 38 is a top plan view of the automatic loader/unloader, shown in the fully extended and fully raised position, with the load on the tow trailer being raised therefrom.

FIG. 39 is a side elevational view of the automatic loader/unloader and tow trailer, shown in the position illustrated in FIG. 38.

FIG. 42 is a side elevational view of the automatic loader/unloader, shown in the fully extended and fully lowered position, with the load disposed adjacent to the inboard end of the conveyor.

FIG. 43 is a side elevational view of the automatic loader/unloader, shown in the fully retracted and fully lowered position, with the load positioned adjacent to the inboard end of the conveyor.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in an installed condition, as shown in FIGS. 1 and 34-43. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
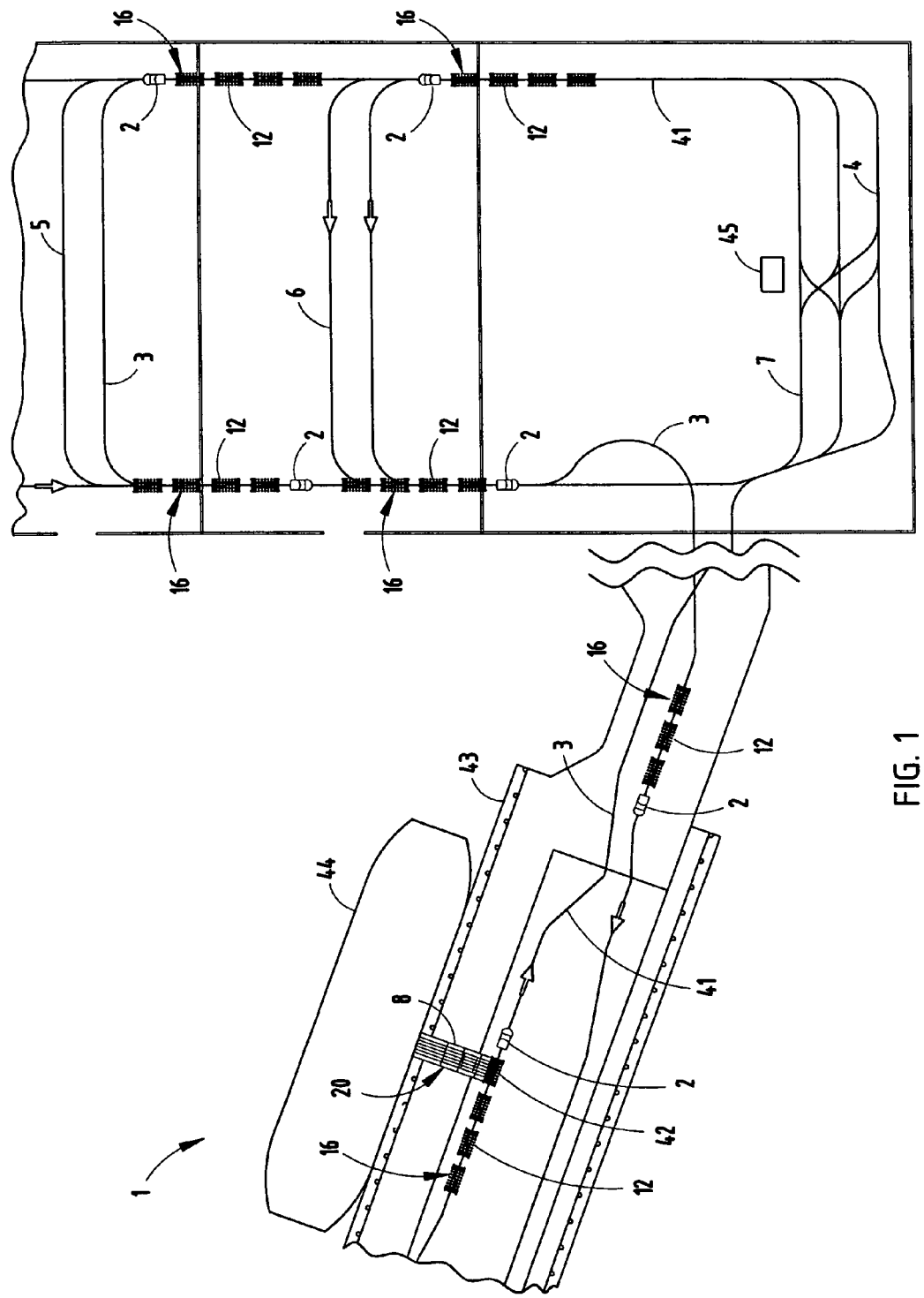
FIG. 1 is a schematic, plan view of an automated material handling system embodying the present invention.
Figure 2:
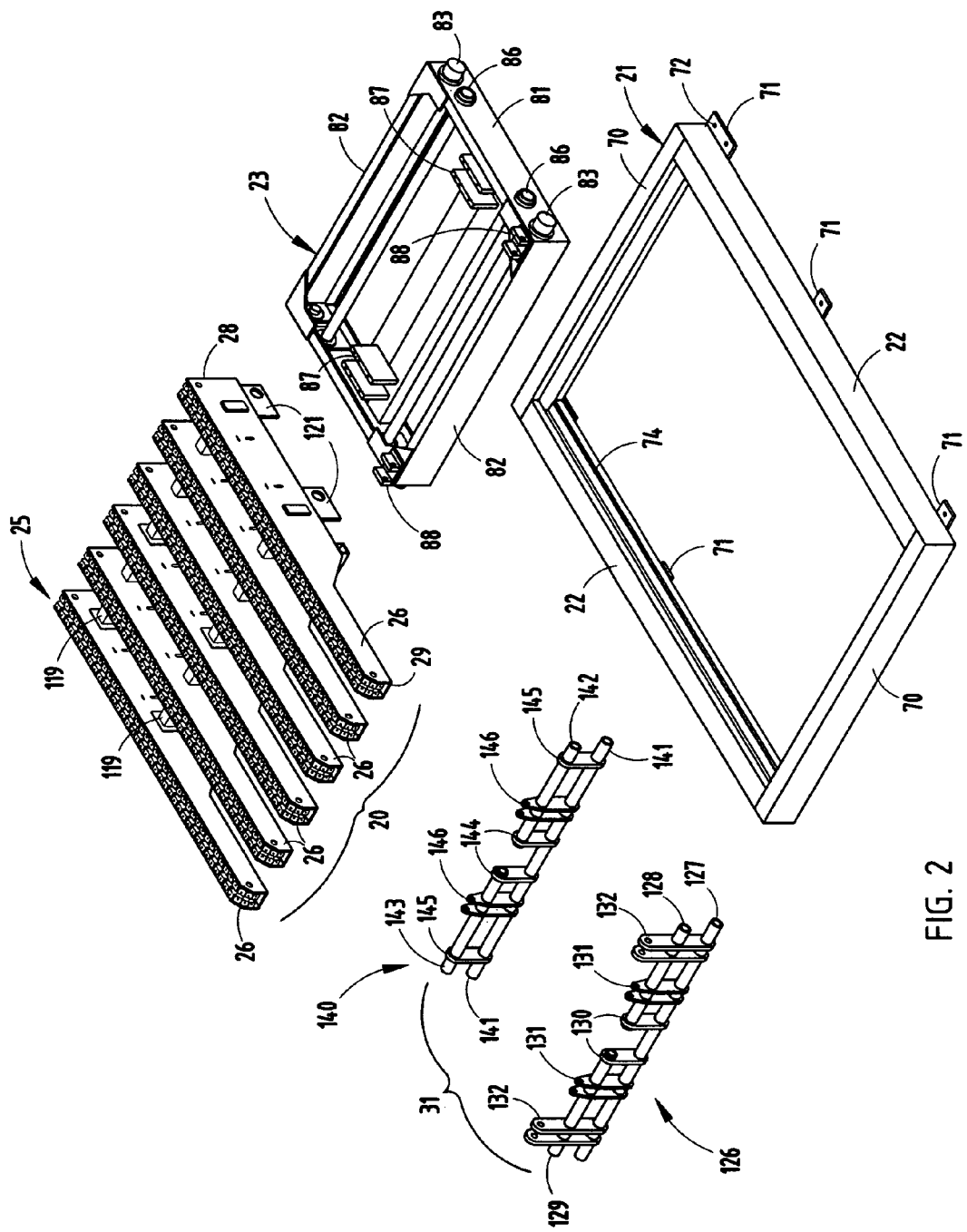
FIG. 2 is an exploded perspective view of an automatic loader/unloader portion of the automated material handling system.

The reference numeral 1 (FIG. 1) generally designates a material handling system embodying the present invention, which in the example illustrated in FIG. 1, includes at least one tow AGV 2 having a guidance system configured to automatically navigate the tow AGV 2 along a predetermined path 3 between various workstations 4-8. A plurality of transport vehicles, such as non-powered tow trailers 12, are configured to support a plurality of loads 13 thereon. The illustrated tow trailers are interconnected in an end-to-end train 16, and are operably connected with AGV 2 to move the train 16 of tow trailers 12 along path 3 between workstations 4-8. An automatic load transfer device 20 (FIGS. 2-5) is provided to load and/or unload the loads 13 onto and/or off of the tow trailers 12, and includes a base 21 configured for mounting on a stationary support surface adjacent to path 3, and includes a pair of longitudinally extending, laterally spaced apart rails 22 in a generally parallel relationship. A carriage 23 (FIG. 2) is movably mounted on the rails 22 of base 21 for longitudinal movement therealong between a retracted position, as shown in FIG. 5, and an extended position, as shown in FIG. 4. A carriage drive 24 (FIGS. 3-5) is operably connected with base 21 and carriage 23 and automatically shifts carriage 23 between the retracted (FIG. 5) and extended (FIG. 4) positions. A conveyor 25 (FIG. 2) has a plurality of rigid, elongate conveyor fingers 26 which are arranged in a generally parallel, laterally spaced apart relationship and support movable conveyor elements 27 (FIGS. 3-5) configured to abuttingly support variously shaped loads 13 thereon and shift the loads 13 between the inboard end 28 and the outboard end 29 of conveyor 25. A conveyor drive 30 is operably connected with conveyor elements 27 and automatically shifts the conveyor elements 27 between the outboard end 29 and the inboard end 28 of conveyor 25. A lift mechanism 31 has a first portion operably connected with base 21, and an oppositely disposed second portion operably connected with conveyor 25, and includes a lift drive 32 which automatically shifts conveyor 25 between a lowered position, as shown in FIG. 5, and a raised position, as shown in FIG. 4. The lift mechanism 31 is connected with a rearward portion of conveyor 25, such that when carriage 23 is in the extended position, the outboard end 29 of conveyor 25 protrudes outwardly from base 21 and is supported therefrom in a cantilevered fashion above the vehicle path 3, as shown in FIG. 3. A controller 33 is operably connected with carriage drive 24, conveyor drive 30 and lift drive 32, and sequentially actives the same to load and unload the loads 13 onto and from the tow trailers 12 by shifting carriage 23 between the retracted and extended positions into and out of vertical alignment with the tow trailers 12, shifting conveyor 25 between the lowered and raised positions to shift the loads onto and off of the tow trailers 12, and shifting the conveyor elements 27 between the inboard and outboard ends 28, 29 of conveyor 25 to move the loads 13 toward and away from the tow trailers 12.

In the example illustrated in FIG. 1, material handling system 1 comprises a fully automated arrangement for transporting large rolls of paper stock between warehousing workstations and loading/unloading workstations. In the illustrated material handling system 1, path 3 comprises a vehicle track which abuttingly supports the tow AGV 2 and the tow trailers 12 thereon, and has a predetermined configuration that extends between the various workstations 4-8. A signal emitting guide path 41 is installed along the center of each portion of the vehicle track 3, which communicates with the tow AGV 2, and includes at least one load/unload station 42. Preferably, guide path 41 has a non-wire construction, such as magnets, lasers or the like, to facilitate installation and reconfiguration. In the example illustrated in FIG. 1, load/unload station 42 is disposed along a shipping dock 43 and is arranged to load and unload loads of rolled paper stock 13 between a train 16 of tow trailers 12 and a docked cargo ship, barge or vessel 44.

In the illustrated example, tow or tugger AGV 2 has a generally conventional construction, and may be of the type known in the trade as a DT100, which is sold by Savant Automation, Inc. The DT100 tow AGV 2 is particularly adapted for heavy industrial environments, and incorporates non-wire, inertial guidance technology, which simplifies installation and future path extensions. In the example shown in FIG. 1, six tow AGVs 2, with associated trains 16 of tow trailers 12, are provided to meet the specific requirements of the illustrated application. In one working example of the present invention, each tow AGV 2 supports three modes of operation, for maximum system and operating flexibility. Remote mode is the normal mode of operation for this system. In remote mode, the vehicle manager system computer is used to assign missions to the AGVs remotely, enabling all picks and drops to be performed automatically. Two other modes included are onboard and recirc. In these two modes, system operators use the onboard AGV control/dispatch panel to select the AGV's next destination(s) before releasing the AGV. This onboard mode permits the route to be executed once. Alternately, operators may place the AGV in recirc and designate a predetermined route for the AGV. The AGV repeats the route (i.e., recirculates) until an operator changes the route.

As will be appreciated by those skilled in the AGV art, while the illustrated material handling system 1 is particularly adapted for use in conjunction with tow AGVs 2 and trains 16 of tow trailers 12, loader/unloader 20 can also be used with other types of automatic guided vehicles and/or load carrying vehicles, as well as other types of material handling systems.

The illustrated material handling system 1 also includes a stationary system manager 45 which incorporates a microprocessor and RF communicators that communicate with the six tow AGVs 2 and automatic loader/unloader 20 to monitor and control their movement. Traffic control gates and systems are also used to route the tow AGVs 2 and tow trailers 12 between workstations 4-8, which may include AGV battery charging stations, load pick up and delivery stations and the like.

The material handling system 1 disclosed herein is particularly adapted for use in conjunction with the handling of materials having relatively fragile support surfaces and/or packaging, such as the illustrated paper stock rolls, whose exposed ends can be readily dented, cut or otherwise damaged by various transfer devices, unless handled carefully. Since damage to the exposed ends of the paper rolls can result in substantial waste in making the final product, it is commercially very important to avoid such damage. In contrast to the present invention, when clamp trucks are used to transport the paper stock rolls over a distance, damage to the roll ends is relatively frequent. However, as will be readily appreciated by those skilled in the art, material handling system 1 can be easily configured and/or adapted for use in conjunction with a wide variety of different applications, particularly in industrial and/or commercial settings. Hence, while the material handling system 1, and various portions thereof disclosed herein relate to the transport of rolled paper stock, it is to be understood that the present invention contemplates many other advantageous uses and applications.

With reference to FIGS. 32 and 33, each of the illustrated tow trailers 12 is non-powered, without automated guidance or other onboard intelligence, and has a substantially identical construction, comprising an open rectangular frame 49 having four ground-engaging wheels 50 supported along the opposite sides thereof by axles 51. Frame 49 comprises a pair of laterally spaced apart, longitudinally extending beams 52 which are supported on axles 51, and interconnected by a plurality of laterally extending beams or risers 53. In the illustrated example, the five centrally disposed risers 53 have a double width construction to provide additional rigidity for supporting loads 13 thereon. The risers 53 are spaced apart a predetermined distance to form spaces therebetween in which the fingers 26 of conveyor 25 can be inserted to load and unload loads 13, as described in greater detail hereinafter. Furthermore, risers 53 are spaced apart longitudinally along beams 52 in a predetermined pattern in accordance with the size of the loads 13 to be supported thereon, such that each load 13, regardless of its size or shape, is abuttingly supported on the top surfaces of at least two of the risers 53. The illustrated tow trailers 12 also include pivoting steering knuckles 54 which rotatably attach the ground-engaging wheels 50 to frame 49, such that each of the four wheels 50 can be steered for greater maneuverability and uniform tracking, particularly in turns along vehicle track 3. The forward end of each of the tow trailers 12 also includes a steering tongue 55 that includes a hitch socket 56 at the outermost end thereof, and an inner end that is pivotally connected to the steering knuckles 54 supporting wheels 50 by tie rods 57 and 58. The rearward ends of tow trailers 12 include ball hitches 59 which engage the sockets 56 on trailer tongues 55 to detachably interconnect the tow trailers 12 in an end-to-end or daisy chain fashion, as illustrated in FIGS. 32 and 33.

The use of dumb or non-intelligent tow trailers 12 in conjunction with a tow AGV 2 and a stationary, fully automated loader/unloader 20 provides significant reliability, economy and maintenance benefits. Preferably, tow trailers 12 have a heavy-duty robust construction that is outdoor rated, and has an uncomplicated design, free of automated lifts and/or transfers, that renders the same relatively inexpensive to manufacture and maintain. Tow trailers 12 eliminate the need for trailer wiring, controls, sensors, drives, chains and the like, and use flat, static decks with fixed risers 53, thereby allowing clamp lift trucks to place or remove loads onto or off of tow trailers 12 without the risk of damage to fragile trailer sensors, wiring, drives or the like. Tow trailers 12 are very robust and durable for use in even harsh operating environments, and can transverse conventional vehicle paths 3 with heavy loads without damaging the loads 13 thereon. In the illustrated example, risers 53 are provided with stainless steel top covers for improved ware and reduced damage to the support surfaces of the loads 13, and are arranged to transport a wide variety of differently shaped loads 13 positioned side-by-side and in other configurations, as shown in FIGS. 32 and 33.

With reference to FIGS. 2-5, the illustrated load transfer device 20 is an automatic, combination loader/unloader, comprising stationary base 21 supporting movable carriage 23 thereon which moves between the extended and retracted positions upon activation of carriage drive 24. Conveyor 25 is attached to carriage 23 by a lift mechanism 31, which in the illustrated example, is in the form of a coupler assembly 65, which pivotally interconnects conveyor 25 to carriage 23, such that rotation of coupler assembly 65 shifts conveyor 25 between the raised and lowered positions, as shown in FIGS. 4 and 5. In the illustrated example, conveyor drive 30 is reversible, such that it can shift conveyor elements 27 in either direction along conveyor fingers 26, such that load transfer device 20 can be used to either unload loads 13 from tow trailers 12, or to load loads 13 onto tow trailers 12. It is to be understood that the present load transfer device 20 can also be configured for use solely as an automatic unloader for removing loads 13 from tow trailers 12, or as an automatic loader to load loads onto the tow trailers 12.

With reference to FIGS. 6-9, the illustrated base 21 has a generally rectangularly-shaped rigid, marginal frame 69 defined by laterally spaced apart side rails 22 extending along the sides thereof, which are interconnected by a pair of end rails 70. A plurality of mounting plates 71 are attached to the lower surface of frame 69, and include vertically extending apertures 72 in which floor anchors (not shown) are received to mount loader/unloader 20 in a stationary fashion on an associated support surface. As best illustrated in FIG. 9, the illustrated side rails 22 are identical beams, each having a generally C-shaped vertical cross-sectional configuration which opens inwardly toward the interior of frame 69, a reinforcing I-beam 73 mounted therein, and upper and lower tracks 74 which provide flat smooth surfaces along which carriage 23 translates. A pair of linear rams 76 are mounted on the upper surfaces of side rails 22 on frame 69, and define a portion of the carriage drive 24 which shifts carriage 23 between the extended and retracted positions on base 21, as described in greater detail hereinafter.

Figure 11:
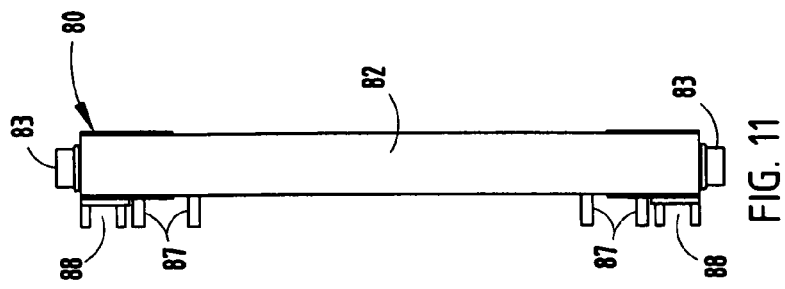
FIG. 11 is an end elevational view of the carriage.
Figure 10:
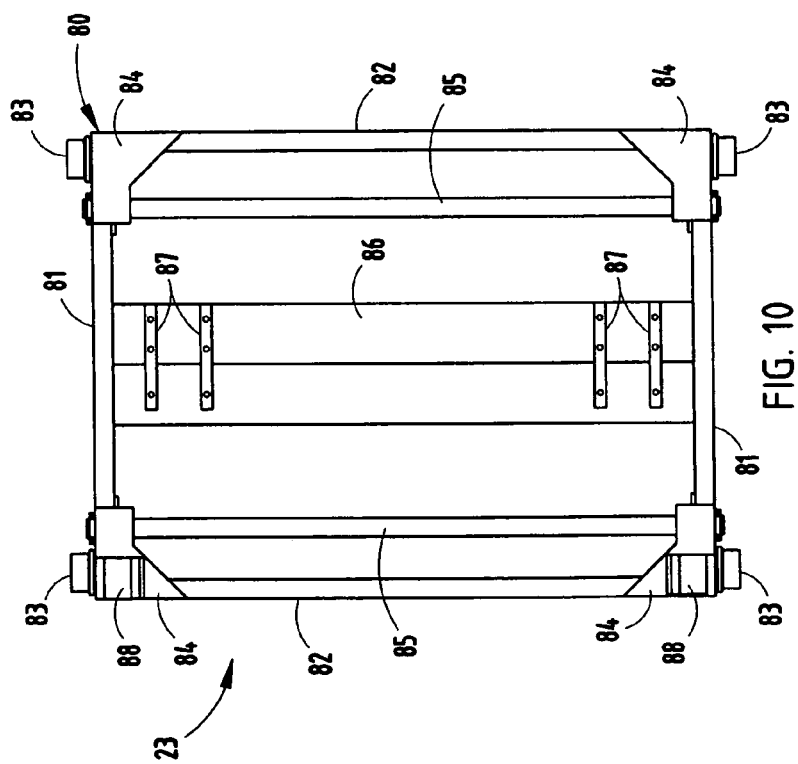
FIG. 10 is a top plan view of a carriage portion of the automatic loader/unloader.
Figure 12:
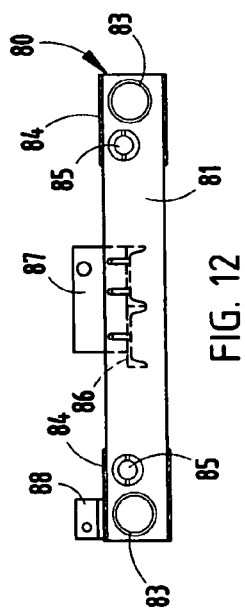
FIG. 12 is a side elevational view of the carriage.

With reference to FIGS. 10-12, the illustrated carriage 23 includes a rigid, marginal frame 80 having a generally rectangular plan configuration defined by a pair of side rails 81 which are laterally spaced apart and rigidly interconnect by a pair of end rails 82. Four solid guide wheels 83 are rotatably attached to frame 80 and extend outwardly from the opposite side rails 81 thereof. Guide wheels 83 are shaped for reception within the tracks 74 on base frame 69, and facilitate smooth and accurate translation of carriage 23 between the retracted and extended positions along base 21. The illustrated carriage 23 includes four corner gussets 84 which are rigidly attached to the corners of frame 80 to rigidify the same, as well as a pair of rigid, cylindrical linkage support shafts 85, which have opposite ends thereof rotatably mounted in side rails 81 of frame 80 a predetermined spaced apart distance from the end rails 82 for purposes to be described in greater detail hereinafter. The illustrated carriage 23 also includes a centrally disposed drive support platform 86 which extends between side rails 81, and includes two pairs of upstanding connector blocks 87 which rotatably mount portions of conveyor drive 30 therein, as described in greater detail hereinafter. A pair of upwardly opening, U-shaped carriage drive connector blocks 88 are mounted at the forward end of carriage frame 80 at opposite sides thereof, and are adapted to mount therein the forward ends of linear rams 76 which form a portion of carriage drive 24, as described in greater detail below.

As best illustrated in FIGS. 13-15, the guide wheels 83 of carriage 23 are received between the tracks 74 in base frame 69 to facilitate smoothly and accurately shifting carriage 23 between the retracted and extended positions. In the illustrated example, linear rams 76 comprise hydraulic cylinders, wherein the cylinder ends 94 are mounted to the rearward end rail 70 of base frame 69, as shown in FIGS. 6 and 7, and the rod ends 95 are operably connected with the carriage connector blocks 88 on carriage 23 by laterally extending connector pins or shafts 96. In the illustrated example, the rod ends 95 of hydraulic cylinders 76 include clevis brackets 97 with laterally extending apertures through which connector shafts 96 are received. Split sleeve retainers 98 are mounted on connector shafts 96, and detachably retain the same in place, such that extension and retraction of the cylinder rods shift carriage 23 between the retracted and extended positions, as shown in FIG. 15.

With reference to FIGS. 16-18, the illustrated conveyor 25 includes six laterally spaced apart and mutually parallel fingers 26, each of which has a continuous loop of conveyor elements 27 movably supported thereon. Conveyor fingers 26 have a substantially identical construction, wherein each includes an elongate, rigid guide bar 102 which slidably supports thereon an endless loop of conveyor chain 103. Each conveyor finger 26 includes an inboard sprocket 104 rotatably mounted at the inboard end 28 of the conveyor 25, an outboard sprocket 105 rotatably mounted at the outboard end 29 of the conveyor 25, a pair of idler sprockets 106 and 107 rotatably mounted on the return side of the conveyor chain 103 toward the inboard end 28 of the finger 26, and a powered drive sprocket 108 disposed between and below idler sprockets 106 and 107. Each conveyor chain 103 is entrained about sprockets 104-108, such that rotation of drive sprocket 108 shifts the individual conveyor elements 27 between the inboard and outboard ends 28, 29 of the conveyor finger 26. In the illustrated example, each of the drive sprockets 108 is interconnected by a drive shaft 109, which is in turn operably connected with a drive motor 110 and associated power transmission unit 111. Consequently, activation of motor 110 rotates drive shaft 109 and each of the drive sprockets 108 in a synchronous fashion, such that the individual conveyor elements 27 move forwardly or rearwardly together, so as to avoid damage to the support surfaces of the loads 13. As best illustrated in FIG. 19, the illustrated conveyor chains 103 include hat-shaped link assemblies 112, comprising a pair of L-shaped link halves 113 interconnect by a pair of connector pins 114 having support rollers 115 rotatably mounted thereon which abuttingly engage the upper surfaces of the guide bars 102. The upper flanges 116 of link halves 113 present flat, horizontal support surfaces which serve to avoid damage to the supporting surfaces of loads 13. In the illustrated example, carriage fingers 26 are laterally interconnected by three rectangular, parallel beams 119, which are disposed at the rearward or inboard end of conveyor 25 (FIGS. 16 and 17), so as to define a rigid frame portion 120 of conveyor 25. Each of the conveyor fingers 26 also includes a pair of downwardly extending mounting plates 121 disposed generally below beams 119, which support mounting shafts 122 thereon, which serve to interconnect conveyor 25 with carriage 23 in the manner described in greater detail hereinafter.

Each of the conveyor fingers 26 has a width and depth which permit the same to be readily inserted into the spaces between adjacent risers 53 on tow trailers 12, as discussed in greater detail below. Also, the width of conveyor 25 is preferably selected in accordance with the length of the tow trailers 12, and the number of conveyor fingers 26 is preferably equal to the number of risers spaces, such that all loads 13 supported on risers 53 of a given tow trailer 12 are simultaneously lifted off of and transferred away from the tow trailer, so as to achieve maximum efficiency.

It is to be understood that while the illustrated conveyor 25 uses endless loops of chain type conveyor elements 27 to transport the loads 13 thereon, other types of conveyor mechanisms can also be used, depending upon the specific type of load to be handled. For example, conveyor fingers 26 could be equipped with powered or unpowered rollers, narrow belts or straps, or other similar conveyor elements for transporting the loads 13 thereon between the inboard and outboard ends 28, 29 of conveyor 25.

With reference to FIG. 20, in the illustrated example, coupler assembly 65 includes a forward linkage 126, which comprises an elongate, tubularly-shaped laterally extending lower shaft 127, and a pair of tubular upper shafts 128 and 129 which are rigidly connected to lower shaft 127 by three sets of connector plates 130, 131 and 132. Each of the connector plates 130-132 has a generally rectangular side elevational configuration with rounded ends, as illustrated in FIG. 23. The two interiormost connector plates 130 on forward linkage 126 include circular apertures adjacent opposite ends thereof which receive therein and are rigidly connected with both the lower shaft 127 and the interiormost ends of upper shafts 128 and 129. The four outermost connector plates 132 on forward linkage 126 are arranged in pairs adjacent opposite ends of forward linkage 126. More specifically, each of the four connector plates 132 has an aperture adjacent the lower end thereof in which the lower shaft 127 is received and rigidly mounted, and an aperture adjacent the center portion thereof in which the exteriormost ends of the upper shafts 128 and 129 are received and rigidly mounted. The uppermost ends of connector plates 132 protrude outwardly from the upper shafts 128 and 129 a predetermined distance to define two bell cranks with laterally extending apertures 133 therethrough to facilitate mounting portions of the lift drive 32, as described in greater detail hereinafter. The four intermediate connector plates 131 on forward linkage 126 are arranged in pairs between connector plates 130 and 132. More specifically, the lower ends of connector plates 131 have apertures in which the lower shaft 127 is receive and rigidly mounted, and central apertures in which medial portions of the upper shafts 128 and 129 are received and rigidly mounted. The outer ends of connector plates 131 protrude outwardly from upper shafts 128 and 129, but to a lesser extent than the outer ends of connector plates 132, and similarly form two bell cranks with laterally extending apertures 134 therethrough to facilitate mounting portions of the coupler assembly 65, as described in greater detail hereinafter. The lower shaft 127, upper shafts 128 and 129, and connector plates 130-132 are all rigidly interconnected to form a rigid, unitary forward linkage 126.

With reference to FIG. 24, the illustrated coupler assembly 65 also includes a rearward linkage 140, which comprises an elongate, tubularly-shaped lower shaft 141, and a pair of tubular upper shafts 142 and 143, which are rigidly interconnected by three sets of connector plates 144-146. Like connector plates 130-132, each of the connector plates 144-146 has a substantially rectangular side elevational configuration with rounded ends. Rearward linkage 140 includes two inner connector plates 144 and two outer connector plates 145 which are substantially identical in construction. Each of the connector plates 144-145 includes an aperture through the lower end thereof through which the lower shaft 127 is received and rigidly mounted, and an aperture through the upper end thereof through which the opposite ends of upper shafts 128 and 129 are received and rigidly attached. Rearward linkage 140 includes two pairs of connector plates 146 which are positioned between connector plates 144 and 145, and include apertures through the lower ends thereof in which the lower shaft 141 is received and rigidly attached and central apertures through which the upper shafts 142 and 143 are received and rigidly attached. The outward ends of connector plates 146 protrude outwardly from the upper shafts 142 and 143, have laterally extending apertures 147 therethrough, and define bell cranks in which portions of the coupler assembly 65 are received, as described in greater detail hereinafter. The lower shaft 141, upper shafts 142 and 143 and connector plates 144-146 are all rigidly interconnected to form a rigid, unitary rearward linkage 140.

With reference to FIGS. 28-31, forward and rearward linkages 126 and 140 interconnect conveyor 25 with carriage 23 in the following manner. The hollow lower shaft 127 on forward linkage 126 is mounted onto the forward support shaft 85 of carriage 23. Similarly, the hollow lower shaft 141 on rearward linkage 140 is mounted on the rearward mounting shaft 85 on carriage 23. The hollow upper shafts 128 and 129 of forward linkage 126 are mounted on the forward mounting shafts 122 of conveyor 25, and the hollow upper shafts 142 and 143 of rearward linkage 140 are mounted on the rearward mounting shafts 122 on conveyor 25. Forward and rearward linkages 126 and 140 thereby form a four-bar type of linkage which interconnects conveyor 25 with carriage 23 in a manner such that rotation of the forward and rearward linkages 126 and 140 both shifts conveyor 25 vertically between the lowered and raised positions, and contemporaneously moves conveyor 25 slightly forwardly and rearwardly relative to carriage 23. With reference to FIGS. 4, 5 and 28-31, in the illustrated example, a pair of tie rods 150 are pivotally mounted between the free ends of connector plates 131 on forward linkage 126 and the outer ends of connector plates 146 on rearward linkage 140 to ensure that the forward linkage 126 and rearward linkage 140 rotate in precise unison to shift conveyor 25 in a level condition between the raised and lowered positions, even when carrying heavy loads at the outboard end of conveyor 25.

In the illustrated example, lift drive 32 comprises a pair of linear rams 154, which in the illustrated example, are in the nature of hydraulic cylinders, having the cylinder ends 155 thereof pivotally mounted between the mounting blocks 87 on carriage 23, and the rod ends 156 pivotally mounted between the outer ends of connector plates 132 on forward linkage 126. Consequently, extension and retraction of hydraulic cylinders 154 rotates forward linkage 126 and rearward linkage 140 to shift conveyor 25 vertically between the lowered and raised positions.

Figure 40:
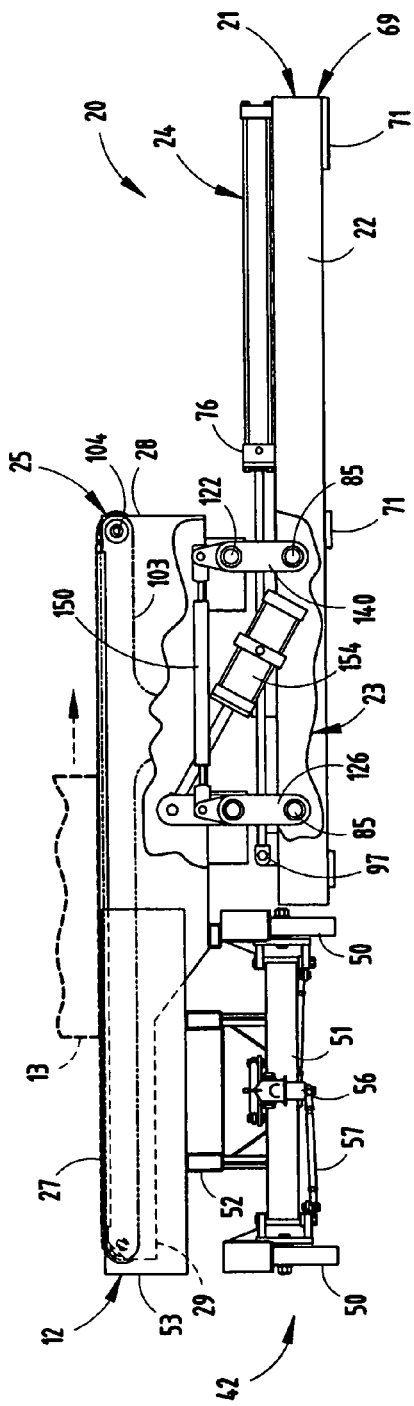
FIG. 40 is a side elevational view of the automatic loader/unloader, shown in the fully extended and fully raised position, with the conveyor being activated to move the load out from vertical alignment with the tow trailer and midway toward the inboard end of the conveyor.
Figure 41:
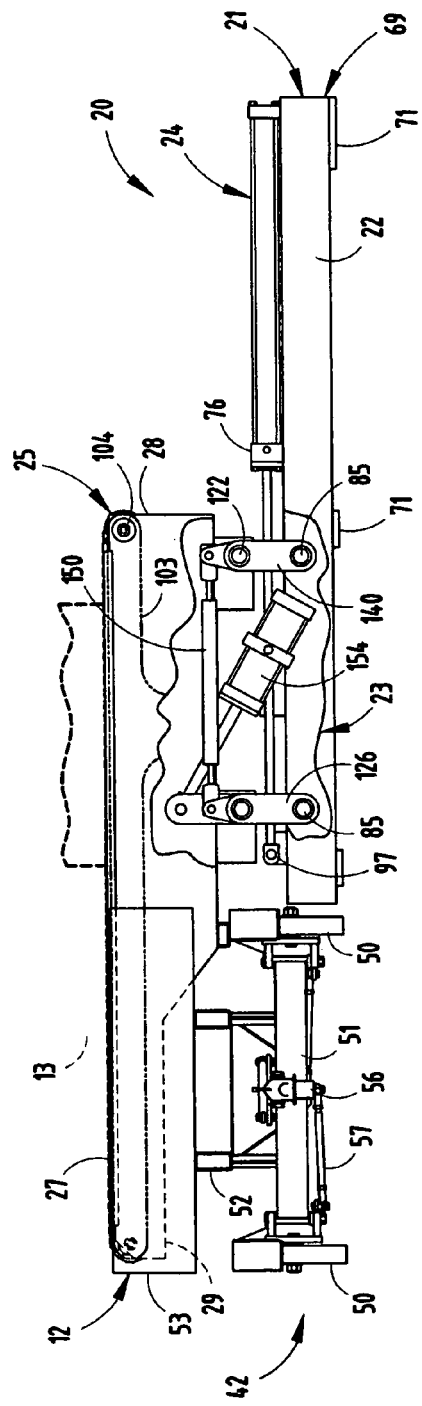
FIG. 41 is a side elevational view of the automatic loader/unloader, shown in the fully extended and fully raised position, with the conveyor having shifted the load adjacent to the inboard end of the conveyor in vertical alignment with the base.

In operation, loader/unloader 20 is an integral part of the overall material handling system 1, and in the illustrated example, is designed to function in the following manner. Each of the tow AGVs with a train 16 of tow trailers 12 attached thereto is programmed to transport loads 13 on the tow trailers 12 from one or more of the warehousing workstations 4-8 to the load/unload station 42 to unload the loads 13 from tow trailers 12, and load the same onto the vessel 44. More specifically, the tow AGV positions the first tow trailer 12 with loads 13 thereon at the load/unload station 42 adjacent to the loader/unloader 20, as shown in FIGS. 34 and 35, with loader/unloader 20 in the normally fully retracted and fully lowered position. Tow AGV 2 positions the first tow trailer 12 immediately adjacent the forward end of base 21, so that the fingers 26 of conveyor 25 are horizontally aligned with the spaces between the risers 53 on the first tow trailer 12, as best shown in FIG. 34. Once the relative position of the first tow trailer 12 and the loader/unloader 20 has been configured, the carriage drive 24 is activated to shift carriage 23 from the fully retracted position to the fully extended position, as shown in FIGS. 36 and 37. Since conveyor 25 remains in the fully lowered position, the fingers 26 on conveyor 25 are positioned below the bottom surfaces of the loads 13, but are in vertical alignment with the same. Next, lift drive 32 is activated to shift conveyor 25 from the fully lowered position to the fully raised position, thereby abuttingly engaging the conveyor elements 27 with the bottom surfaces of the loads 13, and lifting the loads vertically up off of the risers 53 on tow trailers 12 in the manner illustrated in FIGS. 38 and 39. In this position, the conveyor 25 and the loads 13 thereon are supported by the loader/unloader in a cantilevered fashion above the first tow trailer 12 and vehicle path 3. Because conveyor elements 27 are static or non-moving relative to guide bars 102 at the time they engage the bottom support surfaces of loads 13, they do not burse or otherwise damage the same. Also, the wide, flat surfaces of the inverted hat-shaped chain link halves 113 provide substantial supporting surface areas for the rather fragile rolled up outer edges of the coiled paper stock loads 13, so that they do not gouge, bend or rip the edges in a manner that would result in substantial waste when used in high speed printing operations. In one working embodiment of the present invention, conveyor drive 30 is next activated to shift conveyor elements 27 rearwardly, so as to move the loads 13 from the outboard end 29 of the conveyor 25 toward the inboard end 28 of the conveyor 25, as illustrated in FIG. 40, wherein the loads 13 are shown shifted to a medial portion of conveyor 25. Because the lower support surfaces of the loads are supported in a stationary fashion on the moving conveyor elements 27, damage to the same is avoided. After the loads 13 have reached the inboard end of the conveyor, as shown in FIG. 41, they are supported directly above the base portion 21 of the loader/unloader 20, so that the weight of loads 13 is no longer supported in a cantilevered fashion. Next, in the example shown in FIGS. 38-43, with the conveyor elements 27 stationary, the lift drive 32 is again activated to shift conveyor 25 from the raised position to the lowered position, as shown in FIG. 42. The outboard ends 29 of conveyor fingers 26 recede into the spaces formed between the risers 53 on the first tow trailer 12, so as to avoid interference therebetween. Next, carriage drive 24 is activated to shift carriage 23 from the fully extended position to the fully retracted position, as shown in FIG. 43.

It is to be understood that the carriage drive 24, conveyor drive 30 ad lift drive 32 can be actuated in various manners and/or sequences to remove the loads from tow trailers 12. For example, in order to minimize cycle time for loader/unloader 20, after lift drive 32 has been actuated to lift the loads 13 off of tow trailer 12, conveyor drive 30 and carriage drive 24 can be actuated simultaneously to shift the loads 13 rearwardly on conveyor elements 27 and shift carriage 23 rearwardly in a contemporaneous fashion. As soon as the trailing edges of the loads 13 have cleared the risers 53 on tow trailer 12, lift drive 32 can also be actuated to shift the conveyor 25 with loads 13 thereon to the fully lowered position, such that all three drives 24, 30 and 32 can be operating synchronously at the same time to minimize the amount of time needed to move the loads 13 off of tow trailers 12 and position the same at the inboard end of conveyor 25 in the fully retracted position. It will be understood by those skilled in the art that other variations are also contemplated, since loader/unloader 20 can be readily programmed to accommodate a wide variety of different applications.

After the loads 13 have been removed from the first tow trailer 12, tow AGV 2 is activated to advance the second tow trailer 12 with loads 13 thereon to the load/unload station 42. Once the second tow trailer 12 has been properly aligned, the loads 13 are removed therefrom in the same manner as the loads were removed from the first tow trailer 12. The sequence is then repeated, until all of the loads 13 have been removed from each of the tow trailers 12. The tow AGV is then activated to return with each of the empty tow trailers to its designated position along the vehicle path 3. A second tow AGV 2 and its associated train 16 of tow trailers 12 is then programmed to cue at the load/unload station 42, where loads 13 are removed from tow trailers 12 in the same manner.

The loads 13 that are removed from tow trailers 12 and place on conveyor 25 may be transported into the hold of the docked vessel 44 by a wide variety of conventional devices. For example, conveyor 25 may be positioned adjacent to a conventional powered conveyor which transfers the loads to a lift that delivers the loads to awaiting fork lifts in the vessel 44.

As outlined above, the loader/unloader 20 can also be used to move loads 13 from the vessel 44 onto tow trailers 12 for transport to warehouse or processing workstations 4-8 by simply reversing the steps noted above in the unloading sequence. More specifically, with the loader/unloader in its normally fully retracted and fully lowered position, the loads 13 are place thereon at the inboard end 28 of the conveyor 25 using conventional means. The lift drive 32 is then activated to shift the conveyor 25 with loads 13 thereon from the fully lowered position to the fully raised position. The conveyor drive 30 is then activated to shift the loads 13 thereon from the inboard end 28 of the conveyor 25 to the outboard end 29 of the conveyor 25. The carriage drive 24 is then activated to shift the carriage 23 along with the conveyor 25 and loads 13 thereon from the fully retracted position to the fully extended position, so as to position the loads 13 above and in vertical alignment with the risers 53 on the first tow trailer 12. Next, the lift drive 32 is activated to shift the conveyor 25 from the fully raised position to the fully lowered position, thereby gently placing the loads 13 abuttingly onto the upper surfaces of the risers 53 of the first tow trailer 12. The sequence is repeated until each of the empty tow trailers 12 is filled with loads 13.

In the foregoing description, it will be readily appreciated by those skilled in the art that modifications may be made to the invention without departing from the concepts disclosed

The invention claimed is as follows:

1. An automated material handling system, comprising:
a tow AGV having a guidance system configured to automatically navigate said tow AGV along a predetermined path between various workstations;
a plurality of non-powered tow trailers configured to support a plurality of loads thereon, being interconnected in an end-to-end train, and operably connected with said tow AGV to move said train of tow trailers along said path between said workstations;
an automatic load transfer device, comprising:
a base configured for mounting on a stationary support surface adjacent to said path, and including a pair of longitudinally extending, laterally spaced apart rails disposed in a generally parallel relationship;
a carriage movably mounted on said rails of said base for longitudinal movement therealong between a retracted position and an extended position;
a carriage drive operably connected with said base and said carriage and automatically shifting said carriage between said retracted and said extended positions;
a conveyor having a plurality of rigid, elongate conveyor fingers which are arranged in a generally parallel, laterally spaced apart relationship and support movable conveyor elements configured to abuttingly support variously shaped loads thereon and shift the loads between inboard and outboard ends of said conveyor;
a conveyor drive operably connected with said conveyor elements and automatically shifting said conveyor elements between said outboard end and said inboard end of said conveyor;
a lift having a first portion thereof operably connected with said base, an oppositely disposed second portion thereof operably connected with said conveyor, and a lift drive automatically shifting said conveyor between a lowered position and a raised position; said second portion of said lift being connected with a rearward portion of said conveyor, whereby when said carriage is in said extended position, said outboard end of said conveyor protrudes outwardly from said base and is supported thereon in a cantilevered fashion above said path; and
a controller operably connected with said carriage drive, said conveyor drive, and said lift drive, and sequentially activating the same to load and unload loads onto and from said tow trailers by shifting said carriage between said retracted and extended positions into and out of vertical alignment with said tow trailers, shifting said conveyor between said lowered and raised positions to shift the loads onto and off of said tow trailers, and shifting said conveyor elements between said inboard and outboard ends of said conveyor to move the loads toward and away from said tow trailers.

2. An automated material handling system as set forth in claim 1, wherein:
said controller is configured to sequentially activate said carriage drive, said conveyor drive, and said lift drive to unload loads from said transport vehicles by shifting said carriage from said retracted position to said extended position in general vertical alignment with and below the loads disposed on an adjacent one of said tow trailers, shifting said conveyor from said lowered position to said raised position to lift the loads off of said one tow trailers and onto said conveyor elements, and shifting said conveyor elements toward said inboard end of said conveyor to move the loads out of vertical alignment with and away from said one tow trailer.

3. An automated material handling system as set forth in claim 2, wherein:
said controller is configured to sequentially activate said carriage drive, said conveyor drive, and said lift drive to load the loads onto an associated one of said tow trailers by shifting said conveyor with the loads thereon to said raised position, shifting said conveyor elements with the loads thereon toward said outboard end of said conveyor, shifting said carriage to said extended position to position the loads in general vertical alignment with and above an adjacent one of said tow trailers, and shifting said conveyor with the loads thereon toward said lowered position to place the loads onto said one tow trailer.

4. An automated material handling system as set forth in claim 3, wherein:
said lift includes a coupler having a first portion thereof pivotally connected with said base and an oppositely disposed second portion thereof pivotally connected with said conveyor, such that rotation of said coupler shifts said conveyor between said lowered and raised positions.

5. An automated material handling system as set forth in claim 4, wherein:
said lift drive is operably connected with at least one of said coupler, said carriage and said conveyor.

6. An automated material handling system as set forth in claim 5, wherein:
said coupler includes a four bar linkage which pivotally connects said conveyor with said carriage for articulated motion of said conveyor between said lowered and raised positions.

7. An automated material handling system as set forth in claim 6, wherein:
said lift drive comprises a first linear ram having a first end thereof operatively connected with said carriage and an opposite second end thereof operatively connected with said conveyor, such that extension and retraction of said ram articulates said conveyor between said lowered and raised positions.

8. An automated material handling system as set forth in claim 7, wherein:
said conveyor elements include endless loop conveyor chains movably supported on said conveyor fingers.

9. An automated material handling system as set forth in claim 8, wherein:
said conveyor fingers include rigid guide bars on which said conveyor chains are movably supported.

10. An automated material handling system as set forth in claim 9, wherein:
said conveyor drive comprises a motor operably connected with each of said conveyor chains and adapted to shift the same in opposite directions on said guide bars in a synchronous fashion.

11. An automated material handling system as set forth in claim 10, wherein:
said base includes a pair of tracks disposed in said rails; and
said carriage includes wheels positioned in said tracks.

12. An automated material handling system as set forth in claim 11, wherein:
said carriage drive comprises a second linear ram having a first end thereof operably connected with said base and an opposite second end thereof operably connected with said carriage, such that extension and retraction of said second ram horizontally shifts said carriage along said tracks between said retracted and extended positions.

13. An automated material handling system as set forth in claim 12, wherein:
   said conveyor elements include hat-shaped links with flat feet which abuttingly support thereon the loads without damaging the same.

14. An automated material handling system as set forth in claim 13, wherein:
   said guide bars are spaced laterally apart a predetermined distance which is substantially less than the width of the loads, such that each of the loads is supported on at least two of said conveyor chains.

15. An automated material handling system as set forth in claim 14, wherein:
   said tow trailers include a plurality of laterally extending, upstanding risers with upper surfaces configured to abuttingly support the loads thereon; said risers being spaced longitudinally apart along said trailers to define laterally extending spaces therebetween into which said conveyor fingers are inserted to facilitate loading and unloading the loads onto and from said tow trailers.

16. An automated material handling system as set forth in claim 15, including:
   a stationary system manager computer in operable communication with said tow AGV, said guidance system, and said load transfer device, and configured to position a first one of said tow trailers with loads thereon at an unload station on said path adjacent to said load transfer device, and alert said controller to move the loads from said first tow trailer onto said conveyor and shift said carriage back to said retracted position.

17. An automated material handling system as set forth in claim 16, wherein:
   said stationary system manager computer is configured to activate said tow AGV to pull said unloaded first tow trailer away from said unload station and position a second one of said tow trailers with loads thereon at said unload station and alert said controller to remove the loads therefrom onto said conveyor.

18. An automated material handling system as set forth in claim 1, wherein:
   said controller is configured to sequentially activate said carriage drive, said conveyor drive, and said lift drive to load the loads onto an associated one of said tow trailers by shifting said conveyor with the loads thereon to said raised position, shifting said conveyor elements with the loads thereon toward said outboard end of said conveyor, shifting said carriage to said extended position to position the loads in general vertical alignment with and above an adjacent one of said tow trailers, and shifting said conveyor with the loads thereon toward said lowered position to place the loads onto said one tow trailer.

19. An automated material handling system as set forth in claim 1, wherein:
   said lift includes a coupler having a first portion thereof pivotally connected with said base and an oppositely disposed second portion thereof pivotally connected with said conveyor, such that rotation of said coupler shifts said conveyor between said lowered and raised positions; and
   said lift drive is operably connected with at least one of said coupler, said carriage and said conveyor.

20. An automated material handling system as set forth in claim 1, wherein:
   said conveyor elements include endless loop conveyor chains movably supported on said conveyor fingers; and
   said conveyor fingers include rigid guide bars on which said conveyor chains are movably supported.

21. An automated material handling system as set forth in claim 1, wherein:
   said carriage drive comprises a second linear ram having a first end thereof operably connected with said base and an opposite second end thereof operably connected with said carriage, such that extension and retraction of said second ram horizontally shifts said carriage along said tracks between said retracted and extended positions.

22. An automated material handling system as set forth in claim 1, wherein:
   said conveyor elements include hat-shaped links with flat feet which abuttingly support thereon the loads without damaging the same.

23. An automated material handling system as set forth in claim 1, wherein:
   said tow trailers include a plurality of laterally extending, upstanding risers with upper surfaces configured to abuttingly support the loads thereon; said risers being spaced longitudinally apart along said trailers to define laterally extending spaces therebetween into which said conveyor fingers are inserted to facilitate loading and unloading the loads onto and from said tow trailers.

24. An automated material handling system as set forth in claim 1, including:
   a stationary system manager computer in operable communication with said tow AGV, said guidance system, and said load transfer device, and configured to position a first one of said tow trailers with loads thereon at an unload station on said path adjacent to said load transfer device, and alert said controller to move the loads from said first tow trailer onto said conveyor and shift said carriage back to said retracted position.

25. An automatic load transfer device for automated material handling systems of the type which moves loads between various workstations on transport vehicles, comprising:
   a base configured for mounting on a stationary support surface, and including a pair of longitudinally extending, laterally spaced apart rails disposed in a generally parallel relationship;
   a carriage movably mounted on said rails of said base for longitudinal movement therealong between a retracted position and an extended position;
   a carriage drive operably connected with said base and said carriage and automatically shifting said carriage between said retracted and said extended positions;
   a conveyor having a plurality of rigid, elongate guide bars arranged in a generally parallel, laterally spaced apart relationship, and movably supporting thereon conveyor elements configured to abuttingly support variously shaped loads thereon and shift the loads from said outboard end to said inboard end of said conveyor;
   a conveyor drive operably connected with said conveyor elements and automatically shifting said conveyor elements from said outboard end to said inboard end of said conveyor;
   a coupler having a first portion thereof pivotally connected with said base and an oppositely disposed second portion thereof pivotally connected with said conveyor, whereby rotation of said coupler shifts said conveyor between a lowered position and a raised position; said second portion of said coupler being connected with a rearward portion of said conveyor, whereby when said carriage is in said extended position, said outboard end of said conveyor protrudes outwardly from said base and is supported thereon in a cantilevered fashion;

a lift drive operably connected with at least one of said coupler, said carriage, and said conveyor, and automatically shifting said conveyor between said lowered and raised positions; and a controller operably connected with said carriage drive, said conveyor drive, and said lift drive, and sequentially activating the same to unload loads from an associated transport vehicle by shifting said carriage from said retracted position to said extended position in general vertical alignment with and below the loads disposed on the associated transport vehicle, shifting said conveyor from said lowered position to said raised position to lift the loads off of the associated transfer vehicle and onto said conveyor elements, and shifting said conveyor elements toward said inboard end of said conveyor to move the loads out of vertical alignment with and away from the associated transport vehicle.

26. An automatic load transfer device as set forth in claim 25, wherein:

said conveyor drive is reversible for automatically shifting said conveyor elements from said inboard end to said outboard end of said conveyor; and said controller is configured to load the loads onto an associated transport vehicle by shifting said conveyor with the loads thereon to said raised position, shifting said conveyor elements with the loads thereon toward said outboard end of said conveyor, shifting said carriage to said extended position to position the loads in general vertical alignment with and above the associated transport vehicle, and shifting said conveyor with the loads thereon toward said lowered position to place the loads onto the associated transport vehicle.

27. An automatic load transfer device as set forth in claim 26, wherein:

said coupler includes a four bar linkage which pivotally connects said conveyor with said carriage for articulated motion of said conveyor between said lowered and raised positions.

28. An automatic load transfer device as set forth in claim 27, wherein:

said lift drive comprises a first linear ram having a first end thereof operatively connected with said carriage and an opposite second end thereof operatively connected with said conveyor, such that extension and retraction of said ram articulates said conveyor between said lowered and raised positions.

29. An automatic load transfer device as set forth in claim 28, wherein:

said conveyor elements include endless loops of conveyor chain movably supported on said guide bars.

30. An automatic load transfer device as set forth in claim 29, wherein:

said endless loops of conveyor chain include rollers supported on said guide bars.

31. An automatic load transfer device as set forth in claim 30, wherein:

said conveyor drive comprises a motor operably connected with each of said roller chains and adapted to shift said roller chains in opposite directions on said guide bars in a synchronous fashion.

32. An automatic load transfer device as set forth in claim 31, wherein:

said base includes a pair of tracks disposed in said rails; and said carriage includes wheels positioned in said tracks.

33. An automatic load transfer device as set forth in claim 32, wherein:

said carriage drive comprises a second linear ram having a first end thereof operably connected with said base and an opposite second end thereof operably connected with said carriage, such that extension and retraction of said second ram horizontally shifts said carriage along said tracks between said retracted and extended positions.

34. An automatic load transfer device as set forth in claim 33, wherein:

said conveyor elements include hat-shaped links with flat feet which abuttingly support thereon the loads without damaging the same.

35. An automatic load transfer device as set forth in claim 34, wherein:

said guide bars are spaced laterally apart a predetermined distance which is substantially less than the width of the loads, such that each of the loads is supported on at least two of said conveyor chains.

36. An automatic load transfer device for automated material handling systems of the type which moves loads between various workstations on transport vehicles, comprising:

a base configured for mounting on a stationary support surface, and including a pair of longitudinally extending, laterally spaced apart rails disposed in a generally parallel relationship;

a carriage movably mounted on said rails of said base for longitudinal movement therealong between a retracted position and an extended position;

a carriage drive operably connected with said base and said carriage and automatically shifting said carriage between said retracted and said extended positions;

a conveyor having a plurality of rigid, elongate guide bars arranged in a generally parallel, laterally spaced apart relationship, and movably supporting thereon conveyor elements configured to abuttingly support variously shaped loads thereon and shift the loads from said inboard end to said outboard end of said conveyor;

a conveyor drive operably connected with said conveyor elements and automatically shifting said conveyor elements from said inboard end to said outboard end of said conveyor;

a coupler having a first portion thereof pivotally connected with said base and an oppositely disposed second portion thereof pivotally connected with said conveyor, whereby rotation of said coupler shifts said conveyor between a lowered position and a raised position; said second portion of said coupler being connected with a rearward portion of said conveyor, whereby when said carriage is in said extended position, said outboard end of said conveyor protrudes outwardly from said base and is supported thereon in a cantilevered fashion;

a lift drive operably connected with at least one of said coupler, said carriage, and said conveyor, and automatically shifting said conveyor between said lowered and raised positions; and a controller operably connected with said carriage drive, said conveyor drive, and said lift drive, and sequentially activating the same to load loads onto an associated transport vehicle by shifting said conveyor with the loads thereon to said raised position, shifting said conveyor elements with the loads thereon toward said outboard end of said conveyor, shifting said carriage to said extended position to position the loads in general vertical alignment with and above the associated transport vehicle, and shifting said conveyor with the loads thereon toward said lowered position to place the loads onto the associated transport vehicle.

37. A fully automated method for handling materials, comprising:

providing a tow AGV having a guidance system configured to automatically navigate the tow AGV along a predetermined path between a plurality of different workstations in a predetermined sequence;

providing a plurality of non-powered tow trailers configured to abuttingly support a plurality of loads thereon;

forming a vehicle track adapted to abuttingly support the tow AGV and the tow trailers thereon, and having a predetermined configuration that extends along the predetermined path between the workstations;

installing a guide path in the vehicle track which communicates with the tow AGV, and includes at least one load/unload station;

interconnecting the tow trailers in an end-to-end train;

operably connecting the train of tow trainers with the tow AGV to selectively move the train of tow trailers along the vehicle track in the predetermined sequence between the workstations;

positioning an automatic loader/unloader adjacent to the loading/unloading station along the vehicle track, wherein the loader/unloader has a stationary base with a movable carriage supported thereon for automatically shifting the carriage between retracted and extended positions by a carriage drive, a conveyor with a plurality of side-by-side fingers with movable conveyor elements that abuttingly support loads thereon and are automatically shifted between outboard and inboard ends of the conveyor by a conveyor drive, and a lift operably connected between the carriage and the conveyor with a lift drive that automatically shifts the conveyor between lowered and raised positions, such that in the extended position the outboard conveyor end protrudes outwardly from the base and is supported thereon in a cantilevered fashion above the vehicle track;

programming the tow AGV to position a first one of the tow trailers with loads thereon at the load/unload stations; and sequentially activating the carriage drive, the conveyor drive, and the lift drive to unload the loads disposed on the first tow trailers by:

shifting said carriage from the retracted position to the extended position in general vertical alignment with and below the loads disposed on the first tow trailer;

shifting the conveyor from the lowered position to the raised position to lift the loads off of the first tow trailer and onto the conveyor elements; and shifting the conveyor elements toward the inboard end of the conveyor to move the loads out of vertical alignment with and away from the first tow trailer.

38. A method as set forth in claim 37, including:

sequentially activating the carriage drive, the conveyor drive and the lift drive to load the loads onto the first tow trailer by:

shifting the conveyor with the loads thereon to said raised position;

shifting said conveyor elements with the loads thereon toward the outboard end of the conveyor;

shifting the carriage to the extended position to position the loads in general vertical alignment with and above the first tow trailer; and shifting the conveyor with the loads thereon toward the lowered position to place the loads onto the first tow trailer.

* * * * *